(12) United States Patent
Yamaguchi et al.

(10) Patent No.: US 10,396,439 B2
(45) Date of Patent: *Aug. 27, 2019

(54) ANTENNA DEVICE AND COMMUNICATIONS DEVICE

(71) Applicant: Panasonic Intellectual Property Management Co., Ltd., Osaka (JP)

(72) Inventors: Shuichiro Yamaguchi, Osaka (JP); Hiroshi Sakai, Saga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/156,825

(22) Filed: Oct. 10, 2018

(65) Prior Publication Data

US 2019/0044219 A1    Feb. 7, 2019

Related U.S. Application Data

(63) Continuation of application No. 14/426,112, filed as application No. PCT/JP2013/005304 on Sep. 6, 2013, now Pat. No. 10,224,601.

(30) Foreign Application Priority Data

Sep. 6, 2012   (JP) ................................ 2012-195870

(51) Int. Cl.
*H01Q 1/24*        (2006.01)
*H01Q 7/00*        (2006.01)
(Continued)

(52) U.S. Cl.
CPC ......... *H01Q 1/243* (2013.01); *G06K 7/10316* (2013.01); *G06K 7/10336* (2013.01);
(Continued)

(58) Field of Classification Search
CPC ............ H01Q 1/243; H01Q 1/24; H01Q 7/00; H01Q 7/06; H01Q 13/16
(Continued)

(56) References Cited

U.S. PATENT DOCUMENTS 7,710,341 B2    5/2010   Kubo et al.
8,059,062 B2   11/2011   Orihara
(Continued)

FOREIGN PATENT DOCUMENTS

EP     2 424 041 A1       2/2012
JP     2008-131115 A      6/2008
(Continued)

OTHER PUBLICATIONS

Extended European Search Report, dated Mar. 27, 2017, for corresponding EP Application No. 16200659.7—1927, 9 pages.
(Continued)

*Primary Examiner* — Hai V Tran
(74) *Attorney, Agent, or Firm* — Seed IP Law Group LLP

(57) ABSTRACT

A small antenna device having good communications performance and a wide communications area even when a metal plate is present in the antenna communications direction, even when the antenna is arranged, for example, inside a box-shaped metal case, and even when a through hole is used that has a smaller area than the antenna. This device comprises: the antenna; a rear surface cover overlapping with the antenna and being a conductor that faces the winding of the antenna; two first insulating areas provided in the rear surface cover and extending in a direction that intersects the winding axis of the antenna; and a second insulating area that connects between the first insulating areas. At least part of the area sandwiched by the first insulating areas faces the antenna.

20 Claims, 18 Drawing Sheets

(51) Int. Cl.
*G06K 7/10* (2006.01)
*H01Q 13/16* (2006.01)
*H04B 5/00* (2006.01)
*H01F 27/36* (2006.01)
*H01Q 7/06* (2006.01)

(52) U.S. Cl.
CPC ............... *H01F 27/36* (2013.01); *H01Q 1/24* (2013.01); *H01Q 7/00* (2013.01); *H01Q 7/06* (2013.01); *H01Q 13/16* (2013.01); *H04B 5/0081* (2013.01)

(58) Field of Classification Search
USPC .................................................. 343/702, 767
See application file for complete search history.

(56) References Cited

U.S. PATENT DOCUMENTS

| | | |
|---|---|---|
| 2010/0073247 A1 | 3/2010 | Arkko et al. |
| 2010/0231482 A1 | 9/2010 | Yoshida et al. |
| 2011/0050531 A1 | 3/2011 | Yamaguchi et al. |
| 2011/0050535 A1 | 3/2011 | Yamaguchi et al. |
| 2012/0025939 A1 | 2/2012 | Yamaguchi et al. |
| 2012/0116706 A1* | 5/2012 | Nakanishi .......... A61B 5/14532 702/99 |
| 2013/0070172 A1* | 3/2013 | Ooe .................... H05K 7/20972 348/843 |
| 2014/0375262 A1 | 12/2014 | Yamaguchi et al. |

FOREIGN PATENT DOCUMENTS

| | | |
|---|---|---|
| JP | 4684832 B2 | 2/2011 |
| JP | 2012-29258 A | 2/2012 |
| JP | 2013-169122 A | 8/2013 |
| WO | 2011/076582 A1 | 6/2011 |

OTHER PUBLICATIONS

Extended European Search Report, dated Aug. 28, 2015, for corresponding EP Application No. 13835890.8-1811 / 2894716, 4 pages.
International Search Report, dated Nov. 26, 2013, for corresponding International Application No. PCT/JP2013/005304, 2 pages.
Communication pursuant to Article 94(3) EPC, dated Jan. 4, 2019, for European Application No. 16 200 659.7-1205, 6 pages.

* cited by examiner

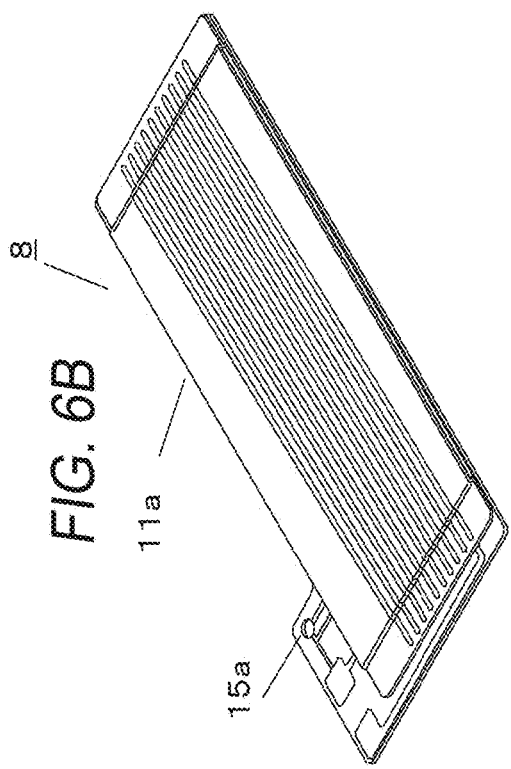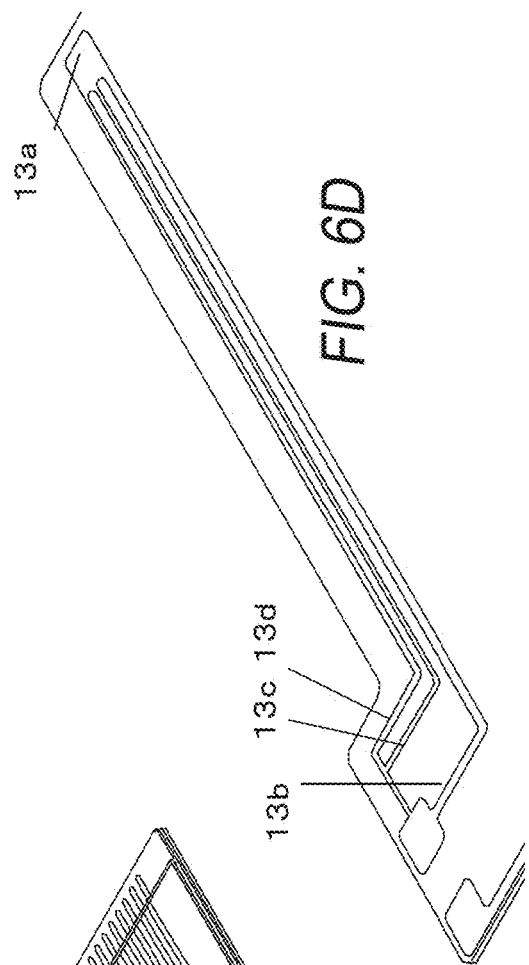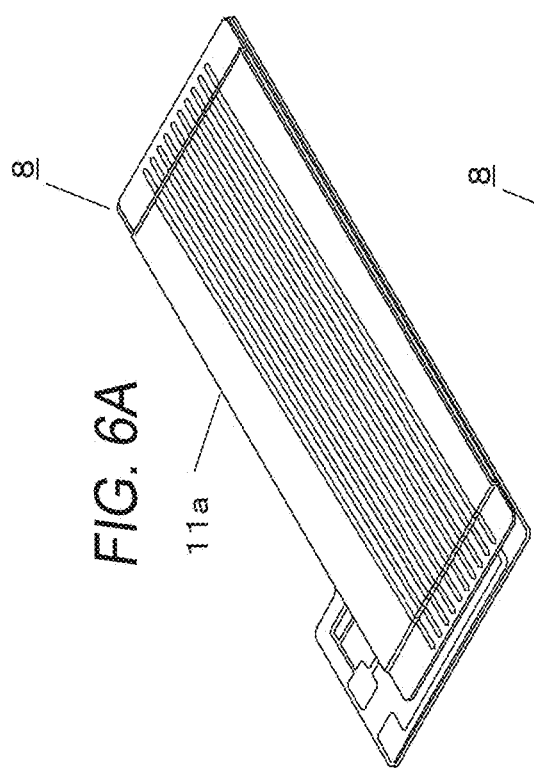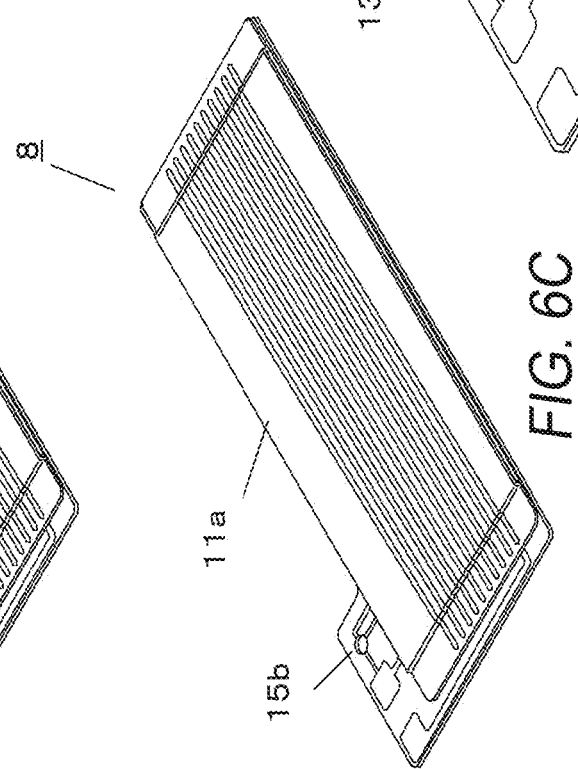

ANTENNA DEVICE AND COMMUNICATIONS DEVICE

BACKGROUND

Technical Field

The present disclosure relates to an antenna apparatus and a communication apparatus that communicate with a wireless communication medium such as an IC card or IC tag of RF-ID or NFC, for example.

Description of the Related Art

For conventional RF-ID (Radio Frequency Identification) or NFC (Near Field Communication) antennas, how to deal with adjacent metal objects has been a problem. That is, when these antennas are each accommodated in a communication apparatus, the antenna is placed while being surrounded by a metal part such as a metal case, electromagnetic wave shield, metal plate inside a liquid crystal panel, or a frame for securing strength. Therefore, when an antenna performs communication, an eddy current that weakens the current or magnetic field of the antenna flows through the metal part, thus deteriorating the communication performance of the antennas. The communication performance deteriorates significantly particularly when a metal body is placed in the communication direction of the antenna.

Thus, an antenna apparatus is proposed which will improve the communication characteristics of a loop antenna using a peripheral metal plate (e.g., see PTL 1). That is, a metal plate is provided with a through hole (opening) and a slit, and the through hole and the opening of the loop antenna are arranged to overlap with each other so that the direction of the current flowing through the loop antenna matches the direction of the eddy current flowing through the outer circumference of the metal plate. In other words, the outer circumference of the metal plate is used as an antenna.

CITATION LIST

Patent Literature

PTL 1
Japanese Patent Publication No. 4684832

BRIEF SUMMARY

Technical Problem

However, since the technique described in PTL 1 uses a loop antenna, it is difficult to reduce the size of the antenna to a certain degree or more. That is, it is difficult to maintain the communication characteristics of the loop antenna without securing the area of the opening, so that the shape of the antenna tends to extend two-dimensionally and it is thus difficult to downsize the antenna and to improve the communication characteristics at the same time. Moreover, the through hole formed in the metal plate has substantially the same size as the opening of the loop antenna, so that it is necessary to form a large through hole in the metal plate or the like, causing a reduction in the strength of the metal plate or to reduce the size of the opening of the loop antenna, causing deterioration of the communication characteristics. In addition, since the outer circumference of the metal plate is used as an antenna, the desired performance cannot be obtained when a box-shaped metal case is used.

An object of the present disclosure is to provide an antenna apparatus and a communication apparatus provided with a wider communicable region than a loop antenna, with a downsized antenna even when the antenna is placed inside a box-shaped metal case, or with a through hole having a smaller area than the antenna.

Solution to Problem

An antenna apparatus according to an aspect of the present disclosure includes: a coil antenna including a wound coil; a conductor that includes a surface facing the wound coil of the coil antenna and that is placed so that a winding axis of the coil antenna is parallel to or diagonally crosses the surface; at least two first insulating regions provided in the conductor and placed apart from each other in a winding axis direction of the coil antenna; and a second insulating region that connects between the at least two first insulating regions, in which a longitudinal direction of each of the at least two first insulating regions crosses the winding axis direction of the coil antenna, and at least part of a region between two outermost ones of the at least two first insulating regions on the surface of the conductor faces the coil antenna.

Advantageous Effects

According to the present disclosure, it is possible to achieve good communication performance with a downsized antenna even when the antenna is placed inside a box-shaped metal case, or with a through hole having a smaller area than the antenna. Furthermore, it is possible to provide an antenna apparatus and a communication apparatus including a wider communicable region than a loop antenna.

BRIEF DESCRIPTION OF THE SEVERAL VIEWS OF THE DRAWINGS

FIGS. 6A to 6D illustrate inductance adjustment of the antenna according to the embodiment of the present disclosure;

DETAILED DESCRIPTION

Hereinafter, an embodiment of the present disclosure will be described in detail with reference to the accompanying drawings.

An antenna apparatus according to an embodiment of the present disclosure includes: a coil antenna including a wound coil; a conductor that includes a surface facing the wound coil of the coil antenna and that is placed so that a winding axis of the coil antenna is parallel to or diagonally crosses the surface; at least two first insulating regions provided in the conductor and placed apart from each other in a winding axis direction of the coil antenna; and a second insulating region that connects between the at least two first insulating regions, in which a longitudinal direction of each of the at least two first insulating regions crosses the winding axis direction of the coil antenna, and at least part of a region between two outermost ones of the at least two first insulating regions on the surface of the conductor faces the coil antenna. Thus, the antenna apparatus according to the present embodiment can obtain good communication performance with a downsized antenna even when the antenna is placed inside a box-shaped metal case, or with a through hole having a smaller area than the antenna. Furthermore, it is possible to provide an antenna apparatus and a communication apparatus including a wider communicable region than a loop antenna.

Embodiment

Figure 1A:
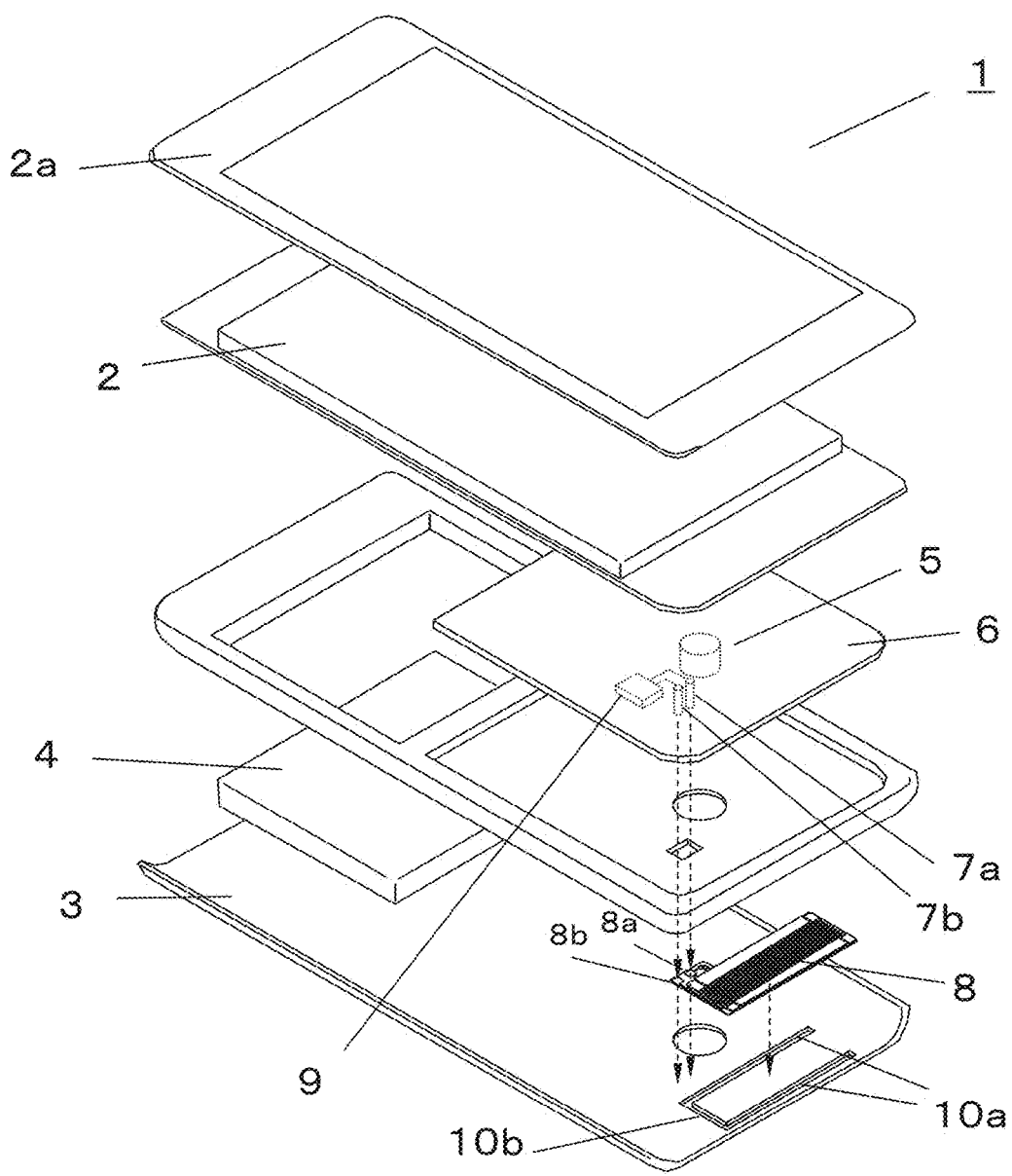
FIG. 1A is an exploded perspective view of a portable terminal in which an antenna according to an embodiment of the present disclosure is installed.
Figure 1B:
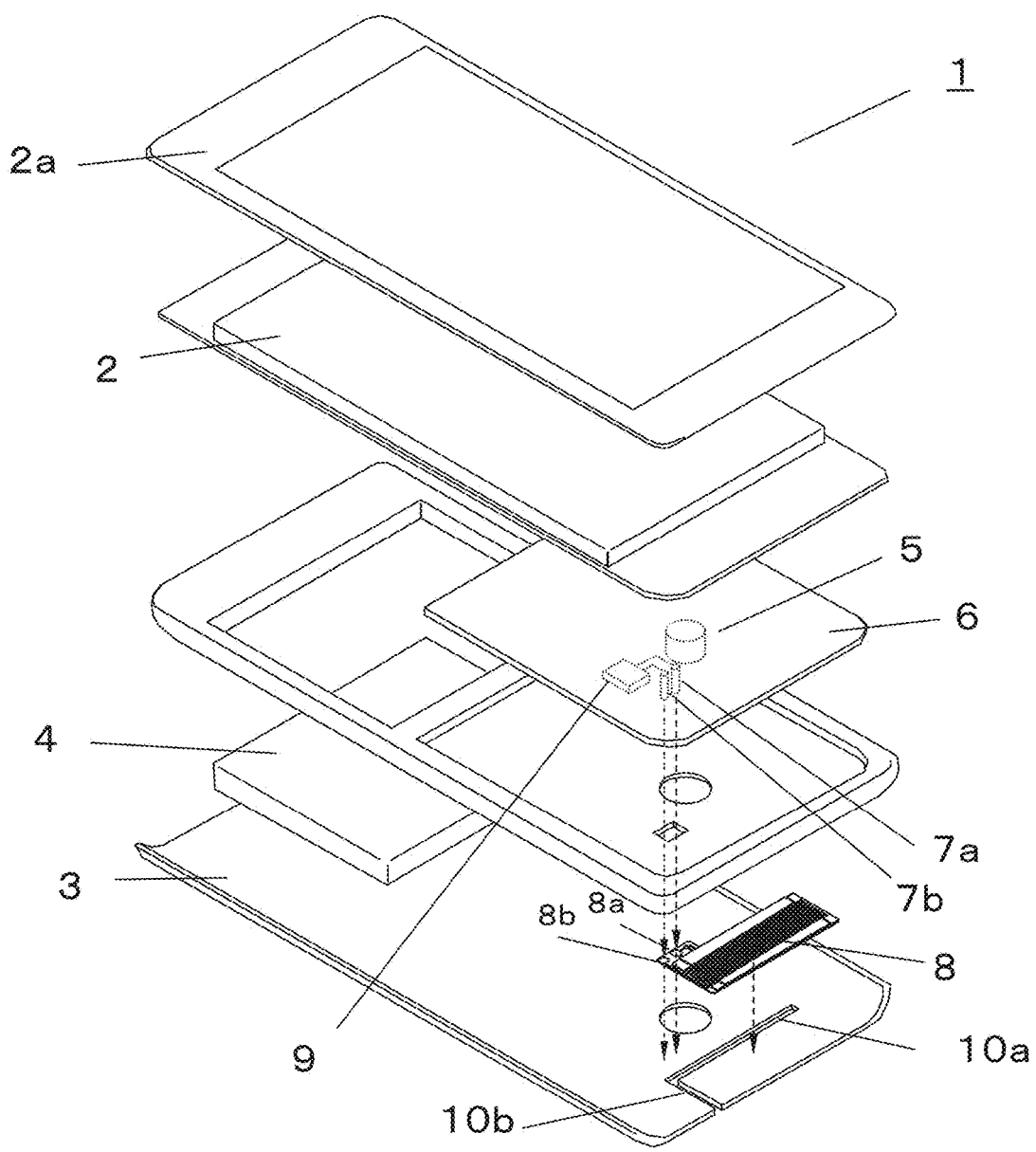
FIG. 1B is an exploded perspective view of a portable terminal in which an antenna according to the embodiment of the present disclosure is installed.

FIGS. 1A and 1B are exploded perspective views of a portable terminal mounted with an antenna according to an embodiment of the present disclosure. FIG. 1A shows a U-shaped slit and FIG. 1B shows an L-shaped slit. Portable terminal 1 is constructed of display panel 2 and rear cover 3, and battery 4, camera 5 and electronic circuit substrate 6 accommodated between display panel 2 and rear cover 3, or the like. As shown in FIG. 1, display panel 2 may be of a touch panel type with no operation buttons or may not be of a touch panel type and may be provided with operation buttons separately. Display panel 2 is a liquid crystal panel and is provided with panel cover 2a. Antenna 8, which is a coil antenna according to an embodiment of the present disclosure, is mounted on metallic rear cover 3 by attachment using an adhesive tape or fixing using a screw or the like. In the present embodiment, antenna 8 is fixed to rear cover 3, but antenna 8 may also be fixed to a frame. The frame may be made of metal or resin. Antenna 8 is used to carry out communication, using a metal body (conductor) such as rear cover 3 placed in a communication direction seen from antenna 8. The conductor is preferably a metal body, but may also be made of other materials. For example, when antenna 8 is to be used for communication beyond a metal body placed closer to display panel 2 than antenna 8, a slit may be formed in the metal body to enable communication, and it does not matter whether rear cover 3 is metal or not in that case. In the present embodiment, antenna 8 is placed close to an upper edge portion of rear cover 3 (edge close to camera 5 which is far from battery 4) and placed between camera 5 and the upper edge portion of rear cover 3. First slit 10a and second slit 10b are placed between a through hole for the camera and the upper edge portion of rear cover 3 as is the case with antenna 8. Antenna 8 may be placed so as to overlap with battery 4, but placing antenna 8 so as to overlap with thinner electronic circuit substrate 6 can reduce the thickness of whole portable terminal 1. In the present embodiment, rear cover 3 has a relatively flat shape, but rear cover 3 may also have a curved surface.

External connection terminals 8a and 8b for making connection to electronic circuit substrate 6 to thereby form an antenna apparatus are provided on the surface of antenna 8 which faces electronic circuit substrate 6. The connection between electronic circuit substrate 6 and antenna 8 may be made by pin contact, connector connection, soldering of a conductor or the like. In the present embodiment, electronic circuit substrate 6 is provided with antenna input and output pins 7a and 7b. As is generally known, antenna input and output pins 7a and 7b are connected to antenna control section 9 on electronic circuit substrate 6 on which a matching circuit and a control IC or the like are placed. The antenna apparatus is formed by connecting antenna input and output pins 7a and 7b to a coil portion having end portions at external connection terminals 8a and 8b provided on antenna 8. In addition to an RF-ID IC and matching circuit, components including a multifrequency antenna, speaker and RF module, for example, are placed in a space formed between rear cover 3 and display panel 2.

In FIG. 1A, rear cover 3a is provided with a U-shaped slit. This slit is provided with two first slits 10a substantially parallel to a winding axis of antenna 8 (coil axis, a conductor of antenna 8 is wound around the coil axis) and second slit 10b that connects between two first slits 10a. Since first slits 10a and second slit 10b may be curved lines or bent lines, first slits 10a and second slit 10b may form various shapes such as U-shape, H-shape, Z-shape, S-shape or numbers like 2 and 5. In FIG. 1B, rear cover 3 is provided with an L-shaped slit. That is, the slit is made up of one first slit 10a and one second slit 10b. However, as is apparent from FIG. 1B, an edge portion (edge) of rear cover 3 is used as second first slit 10a. The metal body such as rear cover 3 may be provided with a through hole, end portion, chip or the like corresponding to at least two first slits 10a and one second slit 10b.

Antenna 8 is placed near first slits 10a and second slit 10b. That is, the entire or most of antenna 8 may face or contact, or may be apart from rear cover 3 (metal body).

Figure 2:
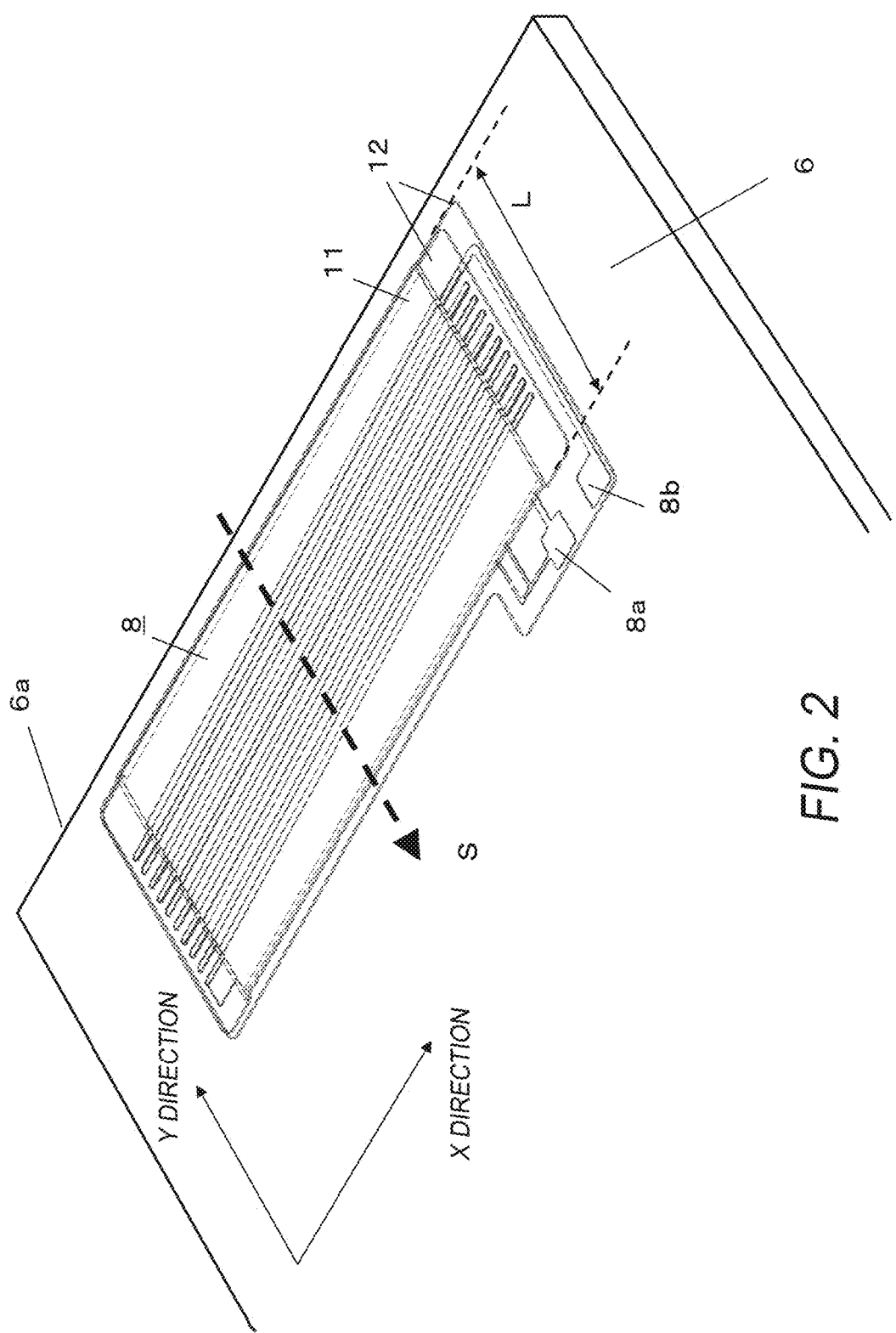
FIG. 2 is a perspective view of the antenna according to the embodiment of the present disclosure.
Figure 3:
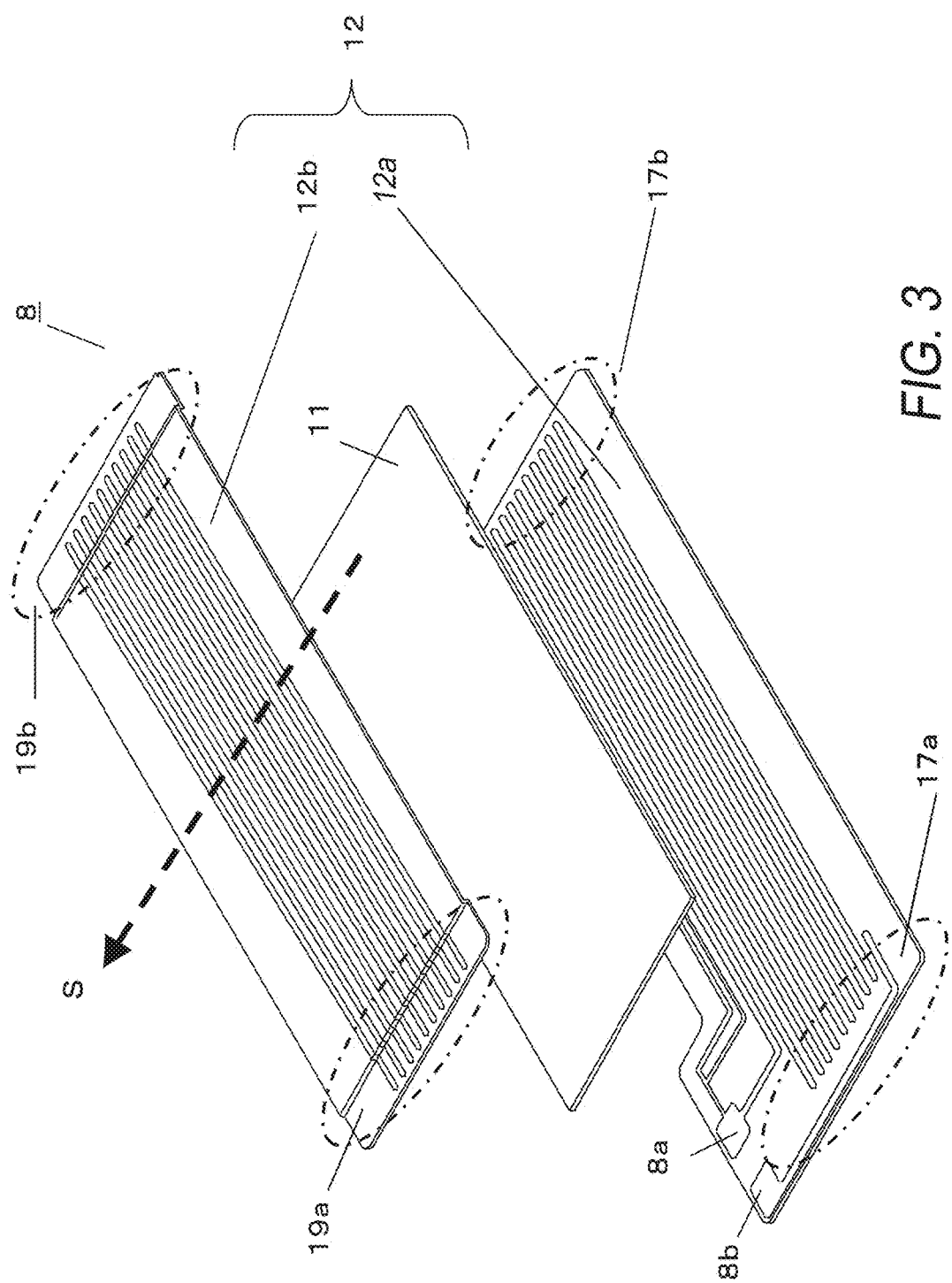
FIG. 3 is an exploded perspective view of the antenna according to the embodiment of the present disclosure.
Figure 4B:
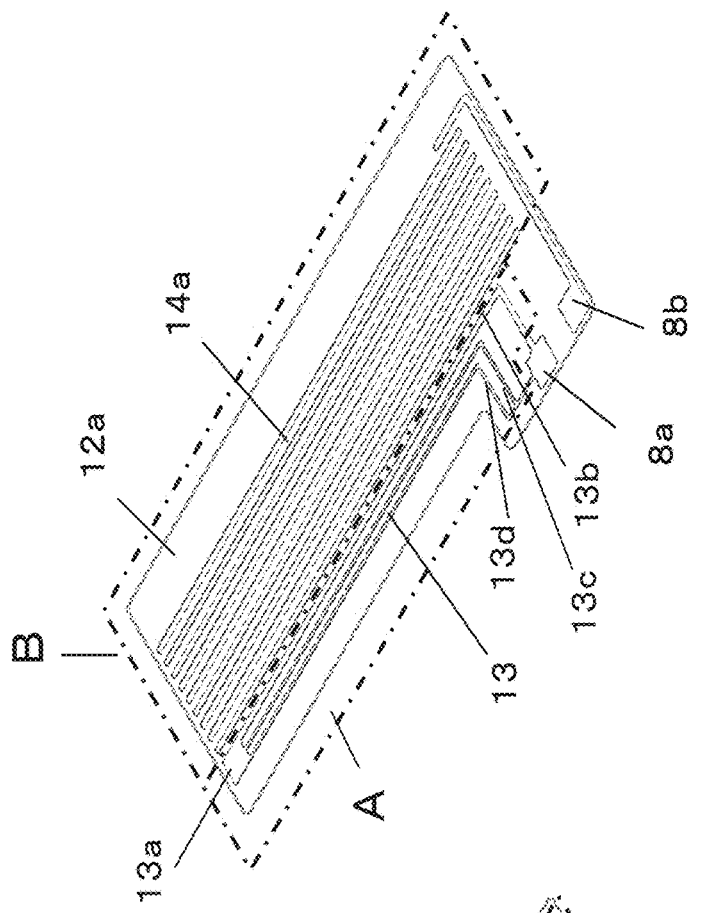
FIGS. 4A and 4B illustrate a conductor placement section and an adjustment pattern of the antenna according to the embodiment of the present disclosure.
Figure 4A:
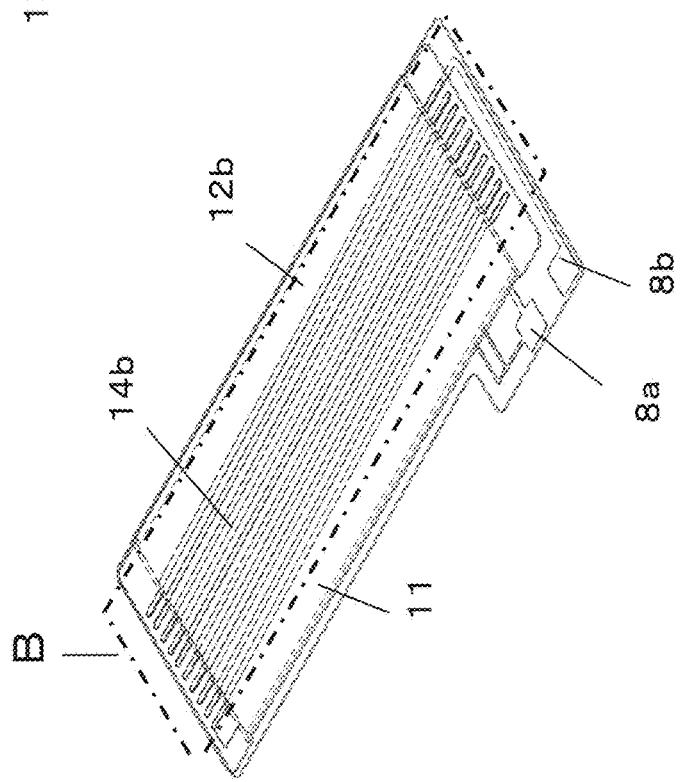

FIG. 2 is a perspective view of the antenna according to the embodiment of the present disclosure. FIG. 3 is an exploded perspective view of the antenna according to the embodiment of the present disclosure. FIGS. 4A and 4B illustrate a conductor placement section of the antenna according to the embodiment of the present disclosure and a coil pattern and an adjustment pattern provided to the conductor placement section.

As shown in FIG. 2, antenna 8 of the present embodiment is provided with core 11 formed of a magnetic body such as ferrite, amorphous, silicon steel, permalloy, soft magnetic material, and flexible substrate 12 arranged so as to wrap around core 11, in which a coil pattern (conductor) or the like is formed on a support mainly made of resin. According to the present embodiment, core 11 is made of ferrite and has a size of 13.7×33.5×0.3 mm, which may be approximately 13.4 to 14 mm×33.2 to 33.8 mm×0.27 to 0.33 mm due to dimensional variations in baking. Core 11 is parallelepiped or rectangular parallelepiped plate shaped in particular. The term "coil pattern" used herein refers to one that is used for generating magnetic lines of force for carrying out communication with a wireless communication medium such as IC card or IC tag (not shown). In FIG. 2 and FIG. 3, a coil pattern whose coil axis (winding axis of coil) is indicated by arrowed straight line S is formed. The coil pattern and an adjustment pattern which will be described later are normally formed of a copper foil which is formed between two resin layers: a polyimide film and a cover lay or resist included in, for example, flexible substrate 12. A coil pattern is wound around this coil axis S as a substantial center, and coil axis S is substantially perpendicular to the coil pattern of flexible substrate 12. A conductor pattern including this coil pattern formed on flexible substrate 12 will be described later in detail with reference to FIG. 4. Note that the conductor is not limited to one based on a conductor pattern alone, but may also be formed by winding a metal wire or the like around core 11 or forming a conductor film on core 11.

Core 11 has a shape extending two-dimensionally in an X direction and Y direction as shown in FIG. 2 and is thin in a thickness direction perpendicular to the X direction (coil winding direction of antenna 8) and Y direction (the same direction as coil axis S (winding axis)). The coil pattern is wound along the X direction. Core 11 is preferably longest in the X direction parallel to the coil pattern and the thickness in the thickness direction is preferably smaller than the widths in the X direction and Y direction.

Flexible substrate 12 is actually divided into two portions holding core 11 in between as shown in FIG. 3. Of flexible substrate 12 divided into two portions, one of the portions having external connection terminals 8a and 8b is designated as lower flexible substrate 12a and the other with no external connection terminals 8a and 8b is designated as upper flexible substrate 12b, for convenience in the present embodiment. As will be described in detail later, lower flexible substrate 12a and upper flexible substrate 12b are bonded by solder. These substrates are connected on two sides of flexible substrate 12 substantially parallel to coil axis S in the present embodiment. The terms "lower" and "upper" are assigned for convenience to facilitate understanding in FIG. 3 and the upper side and lower side may be inverted when antenna 8 is installed on a device.

In the present embodiment, the width of upper flexible substrate 12b in the coil axis S direction is set so that core 11 does not stick out. Particularly when core 11 is made of fragile ferrite, this setting is intended to prevent fragments or residues of the ferrite from scattering inside a communication apparatus into which antenna 8 is incorporated (e.g., portable terminal 1 in FIG. 1) causing an adverse influence on the communication apparatus.

In the present embodiment, a double-sided adhesive tape is used as an adhesive layer to fix core 11 between lower flexible substrate 12a and upper flexible substrate 12b. That is, the double-sided adhesive tape is attached between core 11 and lower flexible substrate 12a and between core 11 and upper flexible substrate 12b.

At least one of surfaces of core 11 respectively facing lower flexible substrate 12a and upper flexible substrate 12b in the present embodiment is provided with slits (not shown) at a pitch of, for example, 2 to 5 mm beforehand. Since core 11 is divided into small fragments using these slits, core 11 is provided with flexibility. As described above, the double-sided adhesive tape is attached to the surface of core 11 of the present embodiment facing lower flexible substrate 12a or upper flexible substrate 12b. Moreover, lower flexible substrate 12a and upper flexible substrate 12b are provided with flexibility from the beginning.

Thus, even when the location of rear cover 3 of portable terminal 1 shown in FIG. 1 to which antenna 8 is attached has a curved surface, antenna 8 can be attached and placed along the curved surface. As a result, at least part of core 11 may be divided through the aforementioned slits and formed of a plurality of small fragments. If core 11 is used alone, core 11 would fall to pieces at this point in time. It is the double-sided adhesive tape attached to the surface facing lower flexible substrate 12a or upper flexible substrate 12b of core 11 that prevents core 11 from falling to pieces. Alternatively, an additional protective tape may be provided. The above-described configuration can prevent some of small fragments of core 11 divided by the aforementioned slits in FIG. 2 and FIG. 3 from falling off and prevent the fallen small fragments or residues from scattering inside a communication apparatus into which antenna 8 is incorporated (e.g., portable terminal 1 in FIG. 1). As a result, it is possible to prevent any adverse influence on the communication apparatus.

The method for fixing core 11 to flexible substrate 12 need not always be attachment using a double-sided adhesive tape to both sides of core 11 as shown in the present embodiment. For example, only one of the sides of the above-described double-sided adhesive tape may be used for fixing. Instead of attaching the double-sided adhesive tape between core 11 and each flexible substrate, lower flexible substrate 12a and upper flexible substrate 12b may be bonded together at two sides of flexible substrate 12 which are substantially orthogonal to coil axis S and not bonded by solder. In this case, lower flexible substrate 12a and upper flexible substrate 12b need to be extended outward beyond the outer edge of core 11 in the coil axis S direction. This part may be bonded by directly applying an adhesive thereto other than the attachment using the double-sided adhesive tape as described above.

In the present embodiment, the double-sided adhesive tape is also attached to the surface of lower flexible substrate 12a not facing core 11, and this is intended to attach and fix antenna 8 to rear cover 3 of portable terminal 1 in FIG. 1 above.

Using FIG. 3 again, the present embodiment will be described. As described above, in lower flexible substrate 12a and upper flexible substrate 12b constituting flexible substrate 12, conductors are bonded together by solder at the two sides of flexible substrate 12 substantially parallel to coil axis S. In FIG. 3, lower flexible substrate 12a is provided with adjustment pattern 13 which will be illustrated later in FIG. 4 and provided with pattern exposing portions 17a and 17b for enabling bonding by soldering. Similarly, upper flexible substrate 12b is also provided with pattern exposing portions 19a and 19b to allow lower flexible substrate 12a and upper flexible substrate 12b to be bonded together by soldering where a coil pattern is divided into a plurality of portions and both ends of the divided pattern are exposed, which will be illustrated later in FIG. 4.

In the present embodiment, solder plating is further applied beforehand to copper foils at both ends of the divided pattern exposed through pattern exposing portions 19a and 19b of upper flexible substrate 12b before flexible substrate 12 is incorporated. Moreover, gold plating is applied beforehand to copper foils at both ends of the divided pattern exposed through pattern exposing portions 17a and 17b provided on lower flexible substrate 12a and copper foils of external connection terminals 8a and 8b. This gold plating is indispensable for securing reliability and preventing corrosion when external connection terminals 8a and 8b come into contact with antenna input and output pins 7a and 7b provided on electronic circuit substrate 6. Thus, even when gold plating or solder plating is applied to a certain portion, the present embodiment uses the expression that the copper foil of the portion is "exposed." As a result, a single coil pattern is formed. The coil pattern formed on flexible substrate 12 and other conductor patterns are formed as shown in FIGS. 4A and 4B to be more specific.

FIG. 4A is identical to the perspective view of the antenna according to the embodiment of the present disclosure shown in FIG. 2 and illustrates the configuration of the upper flexible substrate. FIG. 4B is a perspective view of the lower flexible substrate of the antenna according to the embodiment of the present disclosure. In addition to winding pattern 14a, lower flexible substrate 12a includes external connection terminals 8a and 8b, and adjustment pattern 13.

Antenna 8 includes core 11 which is a magnetic body, winding patterns 14a and 14b which are coil winding sections where a conductor is wound around core 11, and adjustment pattern 13 which is an adjustment section connected to one end of winding patterns 14a and 14b. Since adjustment pattern 13 is formed at an end of core 11, adjustment pattern 13 is not inserted, for example, into winding pattern 14a, and external connection terminal 8a is connected to adjustment pattern 13 while external connection terminal 8b is connected to winding patterns 14a and 14b. Adjustment pattern 13 includes an adjustment pattern which is a plurality of adjustment conductors resulting from division into a plurality of portions in a longitudinal direction. The plurality of adjustment conductors are connected together at both ends, and connected at adjustment pattern end 13a and external connection terminal 8a in FIG. 4B.

That is, a plurality of winding patterns 14a which become parts of the coil pattern for carrying out communication with a wireless communication medium such as an IC card or IC tag are formed on lower flexible substrate 12a parallel to each other and so as to cross coil axis S. The plurality of winding patterns 14b which become parts of the coil pattern are formed on upper flexible substrate 12b parallel to each other and so as to cross coil axis S. The copper foils at both ends of the plurality of winding patterns 14a and 14b are respectively "exposed" through pattern exposing portions 17a and 17b and pattern exposing portions 19a and 19b. In FIGS. 4A and 4B, winding patterns 14a and 14b are formed in region B. It is adjustment pattern 13 which is part of the coil pattern that is formed in region A of lower flexible substrate 12a. In the present embodiment, adjustment pattern 13 is formed only on lower flexible substrate 12a and need not be formed on upper flexible substrate 12b.

Figure 5:
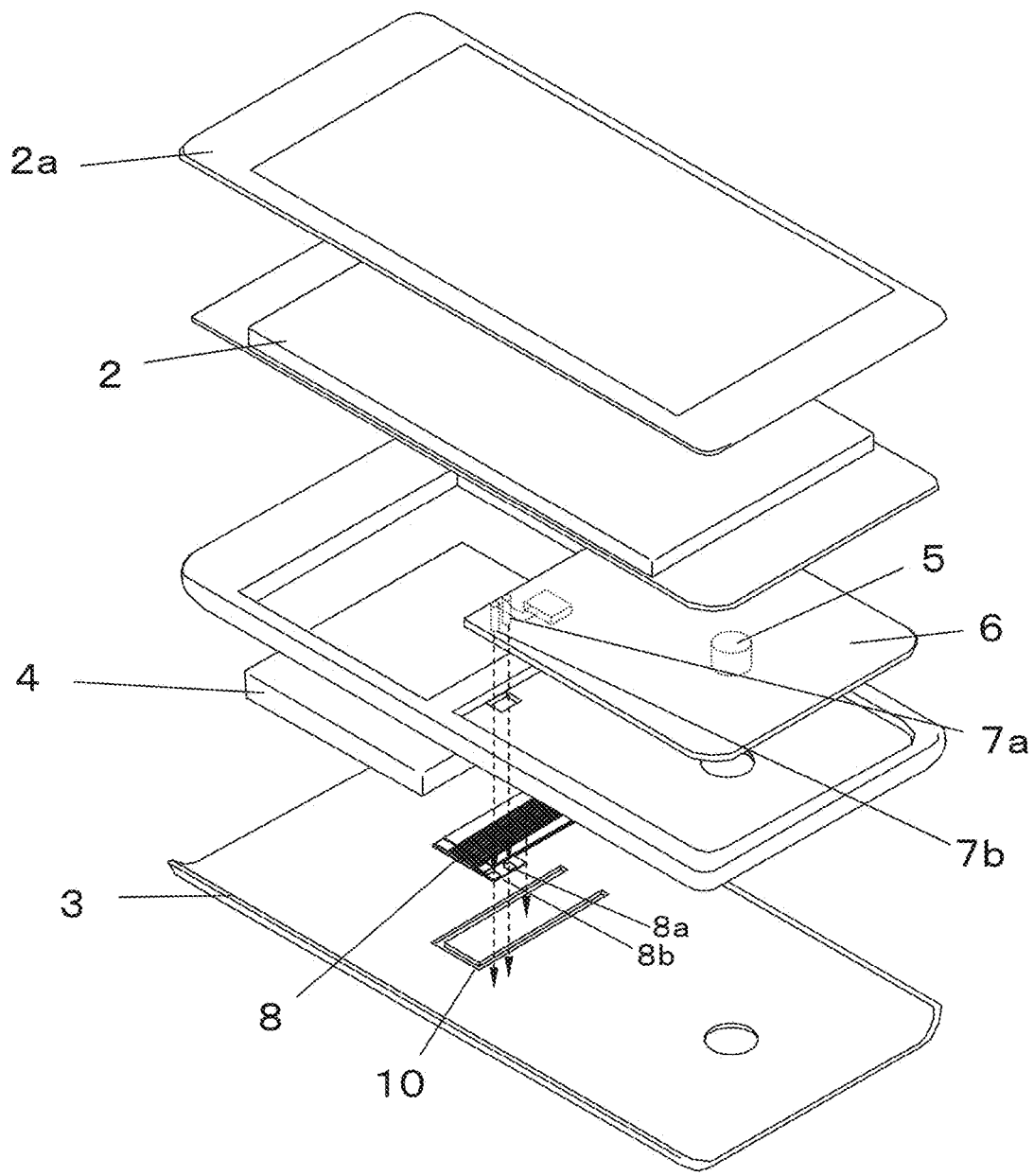
FIG. 5 is an exploded perspective view of a portable terminal in which the antenna according to the embodiment of the present disclosure is installed at a position different from that in FIG. 1.

FIG. 5 is an exploded perspective view of a portable terminal in which the antenna according to the present embodiment is installed at a position different from that in FIG. 1. Even when the antenna is placed on the center side of the communication apparatus as shown in FIG. 5, sufficient communication is possible, and the position where antenna 8 is placed is not limited, and there is a high degree of freedom of design. However, in the position where antenna 8 is placed in FIG. 1, a strong magnetic field is emitted in the distal end direction of portable terminal 1 and the antenna is more likely to react to an external magnetic field from the distal end direction, and can thereby easily communicate with a communicating party located in the distal end direction of portable terminal 1.

FIGS. 6A to 6D illustrate inductance adjustment of the antenna according to the embodiment of the present disclosure. FIG. 6A illustrates a state with no trimming on the adjustment pattern, FIG. 6B illustrates a state with trimming performed at a first trimming point of the adjustment pattern, FIG. 6C illustrates a state with trimming performed at a second trimming point of the adjustment pattern, and FIG. 6D is an enlarged view of the adjustment pattern.

When antenna 8 is connected to electronic circuit substrate 6 on which antenna control section 9 including a matching circuit and others in FIG. 1 to become an antenna apparatus, the inductance of antenna 8 becomes a factor for determining a resonance frequency of the antenna apparatus. The inductance of antenna 8 having the structure of the present embodiment is greatly affected by variations in the size of core 11 shown in FIG. 2 to FIG. 4. This is easily understandable because the influences of the length and the ferrite shape equivalent to the cross-sectional area appear substantially in proportion to each other as defined in the formula of self-inductance of solenoid (self-inductance=magnetic permeability×square of the number of turns per unit length×solenoid length×cross-sectional area).

Thus, since the inductance of antenna 8 varies, the resonance frequency of the antenna apparatus in which antenna 8 is installed also varies. Wireless communication can be performed with a high probability and quality by adjusting this resonance frequency to be within a predetermined range from a central frequency defined in the communication standard (e.g., 13.56 MHz for RF-ID). By reducing variations in the inductance at antenna 8 alone (e.g., reducing it to within ±2%), it is possible to reduce variations in the resonance frequency of the antenna apparatus in which antenna 8 is installed. Therefore, according to the present embodiment, it is possible to reduce variations in the inductance of antenna 8 caused by variations in the size of core 11 of antenna 8 using adjustment pattern 13.

Antenna 8 of the present embodiment includes adjustment pattern 13 of region A and winding patterns 14a and 14b of region B shown in FIG. 4A. In adjustment pattern 13, one pattern (conductor) is divided into three adjustment conductors 13b, 13c and 13d along a longitudinal direction of adjustment pattern 13. Of course, the conductor may be divided into two portions or four or more portions, and the number of portions may be adjusted according to the size of antenna 8 and the degree of variations. Irrespective of the number of portions, adjustment conductor 13b which is the innermost side of adjustment pattern 13 preferably has substantially the same conductor width as winding patterns 14a and 14b, and the wire width of adjustment conductor 13c other than adjustment conductor 13b or the like may be smaller than that of adjustment conductor 13b. Reducing the wire width can achieve downsizing. The width of adjustment conductor 13b on the innermost side of adjustment pattern 13 is set to substantially the same as the conductor width of winding patterns 14a and 14b because there may be a case where, of adjustment pattern 13, only adjustment conductor 13b may remain through trimming as shown in FIG. 6C when the inductance value is adjusted, which will be described later.

Adjustment conductors 13b to 13d extend parallel to winding patterns 14a and 14b. The term "trimming" used herein means disconnecting (insulating) the wire of the pattern through punching or laser processing at first trimming point 15a, second trimming point 15b or the like. Note that most of winding patterns 14a and 14b and adjustment conductors 13b to 13d are basically placed so as to face (overlap with) core 11. This is natural for efficiently obtaining the antenna performance because core 11 has the function of collecting the magnetic flux.

Next, the method for adjusting an inductance value will be described. In the present embodiment, since adjustment pattern 13 is divided into three adjustment conductors 13b to 13d, there are two trimming points: first trimming point 15a and second trimming point 15b. That is, when adjustment pattern 13 is divided into n portions, (n−1) trimming points are formed, and the inductance value is adjusted by trimming or not trimming one of these trimming points.

The distance from adjustment conductors 13b to 13d that can be handled as a single conductor by being connected at adjustment pattern end 13a and external connection terminal 8a to end portion 11a of core 11 differs in FIG. 6A to FIG. 6C. Adjustment conductors 13b to 13d are substantially parallel to end portion 11a of core 11 and may be arranged while inclining to each other up to ±45 degrees, but are not arranged to be at least perpendicular to each other.

In FIG. 6A, none of three adjustment conductors 13b to 13d is trimmed. Therefore, adjustment pattern 13 functions as a single thick conductor placed near end portion 11a of core 11 and adjustment conductor 13d becomes the outermost coil pattern. The distance from outermost adjustment conductor 13d to end portion 11a of core 11 is short.

In FIG. 6B, adjustment pattern 13 is trimmed (insulated) at first trimming point 15a. Therefore, of adjustment pattern 13, it is only adjustment conductors 13b and 13c that are actually functioning. As a result, adjustment conductor 13c becomes the outermost coil pattern and the distance from outermost adjustment conductor 13c to end portion 11a of core 11 is large compared to FIG. 6A.

In FIG. 6C, adjustment pattern 13 is trimmed at second trimming point 15b. Therefore, it is only adjustment conductor 13b that is actually functioning in adjustment pattern 13. As a result, adjustment conductor 13b becomes the outermost coil pattern and the distance from outermost adjustment conductor 13b to end portion 11a of core 11 is large compared to FIGS. 6A and 6B.

In the antenna coil having the structure of the present embodiment configured by winding a coil around the core, both end portions of the core where no coil is wound become an input and output port of magnetic flux of the antenna, and therefore if the number of turns in the antenna coil is the same, the greater the sizes of the input and output port of magnetic flux, the greater the inductance value tends to become. FIG. 6A shows the state in which the size of the input and output port of magnetic flux is smallest while FIG. 6C shows the state in which the size of the input and output port of magnetic flux is largest.

As a result, since the distances from adjustment conductors 13b to 13d to end portion 11a of core 11 differ from each other, the size of the input and output port of magnetic flux changes. As a result, the inductance value of antenna 8 can be adjusted.

In both FIG. 6B and FIG. 6C, it is only necessary to trim a single location.

That is, no matter how many portions into which adjustment pattern 13 may be divided, both ends of a plurality of adjustment conductors 13b, 13c, 13d . . . , and so forth are connected on the adjustment pattern end portion 13a side and on the external connection terminal 8a side and are arranged in parallel. Therefore, it may be possible to set the number of adjustment conductors (from inside core 11) to be left as adjustment pattern 13 and the number of adjustment conductors (from outside core 11) to be disconnected so that the length of the coil pattern and the distance between end portion 11a of core 11 and adjustment pattern 13 becomes a desired distance, and thus to trim only a single location therebetween. Thus, always placing the adjustment conductor to be left as adjustment pattern 13 on the inner side of core 11 and always placing the adjustment conductor to be disconnected at the outer side of core 11 makes it possible to limit trimming points to be a single location and easily adjust the inductance value of antenna 8.

Figure 7:
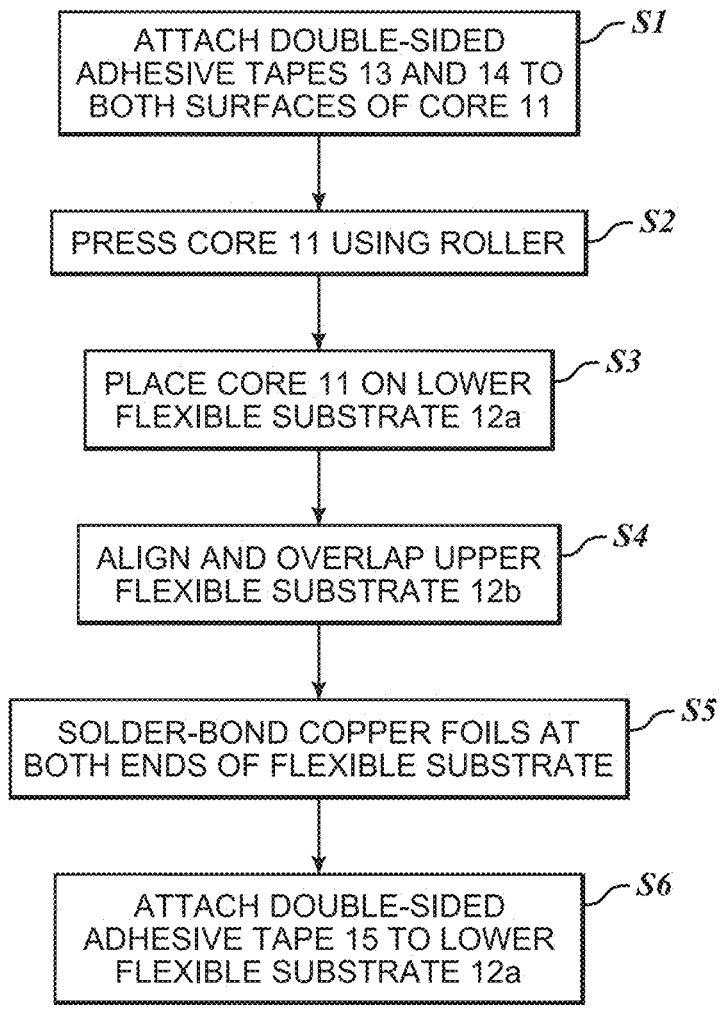
FIG. 7 illustrates an example of manufacturing steps of the antenna according to the embodiment of the present disclosure.

FIG. 7 illustrates an example of manufacturing steps of the antenna according to the embodiment of the present disclosure.

As has already been described, at least one of the surfaces of core 11 facing lower flexible substrate 12a or upper flexible substrate 12b shown in FIG. 3 is provided with slits (not shown) at a pitch of several mm beforehand. These slits are formed before a baking step when core 11 is created. As a preliminary stage of this baking step, slits are formed in a size and to a depth that would not cause core 11 to be easily broken at the slits even after the baking step. When core 11 is thin, it may not be necessary to form any slits. Moreover, instead of slits, small dents may be formed in the surface of core 11 at intervals of about 1 mm.

A double-sided adhesive tape is attached to one of the surfaces of core 11 subjected to such a baking step, the surface facing lower flexible substrate 12a or upper flexible substrate 12b (step S1 in FIG. 7). The double-sided adhesive tape is attached to both surfaces of core 11 in the present embodiment.

As is well known, each side of the double-sided adhesive tape is supported by a support film for ease of handling. As a matter of course, in step S1 in FIG. 7, when the double-sided adhesive tape is attached to both surfaces of core 11 shown in FIG. 3, these support films remain. In this state, one of the surfaces of core 11 to which the double-sided adhesive tape is attached is pressed by, for example, a roller (step S2 in FIG. 7).

Then, at least part of core 11 is divided by the slits such that core 11 is made up of a plurality of fragments. However, core 11 would not fall to pieces because the double-sided adhesive tape is attached to both surfaces of core 11. Even when the area of rear cover 3 of portable terminal 1 shown in FIG. 1 to which antenna 8 is attached has a curved surface, such a state of core 11 allows core 11 to be placed along the curved surface.

When antenna 8 is incorporated or installed in portable terminal 1 (see FIG. 1) or the like, stress not expected by the operator may be applied to core 11. In this case, some small fragments of core 11 divided by the slits may fall, but it is possible to prevent scattering of the fragments or residues that have fallen inside the communication apparatus (e.g., portable terminal 1 in FIG. 1) into which antenna 8 is incorporated. It is thereby possible to avoid any adverse influence on the communication apparatus.

During the pressing by the roller, the aforementioned support film of the double-sided adhesive tape shown in FIG. 3 can prevent the double-sided adhesive tape from being attached to the roller or the workbench facing the roller.

The double-sided adhesive tape to be attached to the side of lower flexible substrate 12a on which core 11 is not placed is attached after completion of the placement, alignment and solder bonding of upper flexible substrate 12b to lower flexible substrate 12a, which will be described later. This is an idea for using a low-cost double-sided adhesive tape material that is not resistant to heat applied during solder bonding to eliminate the need for use of an expensive heat-resistant tape.

As described above, core 11 which has been made bendable to a certain extent is placed on lower flexible substrate 12a (step S3 in FIG. 7). In this case, core 11 is placed on lower flexible substrate 12a after peeling the support film of the double-sided adhesive tape attached to the surface of core 11 facing lower flexible substrate 12a. The location at which core 11 is placed is inside the area shown by a dotted line in FIG. 4A.

After placing core 11 shown in FIG. 3 on lower flexible substrate 12a, upper flexible substrate 12b is then placed from above core 11. In this case, upper flexible substrate 12b is also placed after peeling the support film of the double-sided adhesive tape attached to the surface of core 11 facing upper flexible substrate 12b. Upper flexible substrate 12b is aligned such that core 11 is placed inside the area bounded by dotted line shown in FIG. 4B (step S4 in FIG. 7).

Several methods are available to align lower flexible substrate 12a and upper flexible substrate 12b between which core 11 is placed. For example, though not shown in the drawings of the present embodiment, holes or markers of alignment pins may be provided beforehand at outer edges of lower flexible substrate 12a and upper flexible substrate 12b and alignment is performed using the holes or markers. After performing solder bonding between lower flexible substrate 12a and upper flexible substrate 12b to be described hereinafter, unnecessary holes or markers may be removed. This facilitates alignment between pattern exposing portions 17a and 19a and between pattern exposing portions 17b and 19b, and can more reliably assemble flexible substrate 12 on which a coil pattern for communicating with a wireless communication medium such as an IC card or IC tag is formed. When holes or markers cannot be provided, it is also possible to use a method of aligning upper flexible substrate 12b with lower flexible substrate 12a using an image recognition apparatus and robot or the like.

After performing such alignment, lower flexible substrate 12a is solder-bonded to upper flexible substrate 12b (step S5 in FIG. 7). Here, the positions of the copper foils at both ends of the divided pattern exposed by pattern exposing portions 19a and 19b of upper flexible substrate 12b match the positions of the copper foils at both ends of the divided pattern exposed by pattern exposing portions 17a and 17b of lower flexible substrate 12a. That is, in FIG. 3, since the positions of the respective copper foils match, a single coil pattern is formed by solder-bonding lower flexible substrate 12a to upper flexible substrate 12b.

Solder-bonding is performed by heating the overlapping area between pattern exposing portions 17a and 19a and the overlapping area between pattern exposing portions 17b and 19b. As described above, solder plating is applied beforehand to the copper foils at both ends of the divided pattern exposed by pattern exposing portions 19a and 19b of upper flexible substrate 12b. Gold plating is applied beforehand to the copper foils at both ends of the divided pattern exposed by pattern exposing portions 17a and 17b provided on lower flexible substrate 12a. Therefore, when the part is heated, the solder plated to the copper foil of upper flexible substrate 12b melts and lower flexible substrate 12a is bonded to the copper foil.

The double-sided adhesive tape is not resistant to heat, so that only the area where pattern exposing portions 17a and 19a overlap and the area where pattern exposing portions 17b and 19b overlap is heated so as to prevent heat from being applied to the double-sided adhesive tape. This heating apparatus for solder-bonding may be removed from flexible substrate 12 after the solder melts, the copper foil of upper flexible substrate 12b is bonded to the copper foil of lower flexible substrate 12a, and the solder is cooled and solidified. As such a heating method that requires local, speedy and fine temperature control, bonding using pulse heat is suitable, for example.

However, soldering through solder plating applied to pattern exposing portions 19a and 19b of upper flexible substrate 12b alone may not be enough for bonding of lower flexible substrate 12a to upper flexible substrate 12b. In such a case, a solder cream layer may be formed on one of both end portions of the divided pattern of pattern exposing portions 17a and 17b of lower flexible substrate 12a and both end portions of the divided pattern of upper flexible substrate 12b.

Note that an ACF (anisotropic conductive film) may be used instead of the aforementioned solder bonding. That is, before step S4 in FIG. 7 above, an ACF is attached to one of pattern exposing portions 17a and 17b of lower flexible substrate 12a and pattern exposing portions 19a and 19b of upper flexible substrate 12b shown in FIG. 3. In this case, step S5 in FIG. 7 above, that is, the solder bonding step is unnecessary.

Lastly, the double-sided adhesive tape is attached to the side of lower flexible substrate 12a on which core 11 is not placed (step S6 in FIG. 7). As described above, this is because the double-sided adhesive tape is not resistant to heat applied during solder bonding. As is generally known, each side of a double-sided adhesive tape is supported by a support film for ease of handling. As a matter of course, in step S6 in FIG. 7, when the double-sided adhesive tape is attached to lower flexible substrate 12a of antenna 8 shown in FIG. 3, the support film remains. This support film is peeled off before antenna 8 completed through the above-described steps as shown, for example, in FIG. 1 is installed in portable terminal 1.

Using the above-described steps, antenna 8 shown in FIG. 2 can be assembled extremely simply and with high accuracy. As illustrated using FIG. 3 and FIG. 7, since the configuration is employed so that the double-sided adhesive tape is attached beforehand to both planes of core 11, core 11 is aligned with flexible substrate 12 and then soldered, even if alignment of the core fails, alignment can be done over again before soldering. It is thereby possible to reduce the assembly reject rate of antenna 8 shown in FIG. 2.

Lastly, the relationship between the metal body, the through hole provided in the metal body, and antenna 8, and excited magnetic flux, which are features of the present embodiment will be described. Although antenna 8 (core 11) has a substantially square shape in FIG. 8 and after FIG. 8 for simplicity of description, there is no particular limitation to the shape.

Figure 8A:
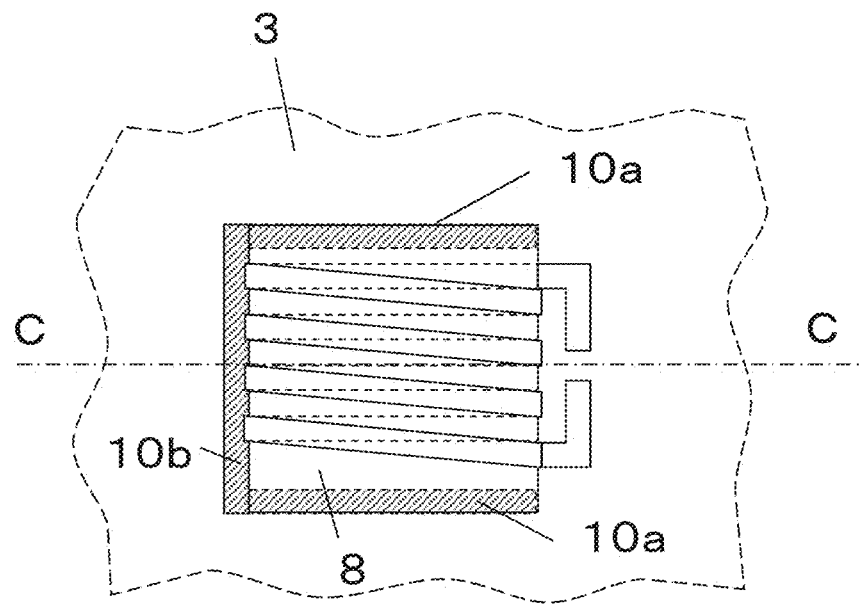
FIGS. 8A and 8B illustrate a positional relationship between the antenna and a metal body according to the embodiment of the present disclosure.
Figure 8B:
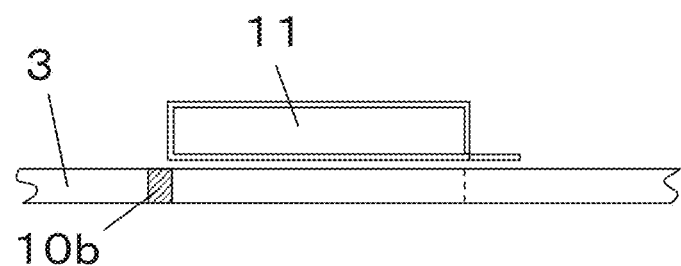
Figure 9A:
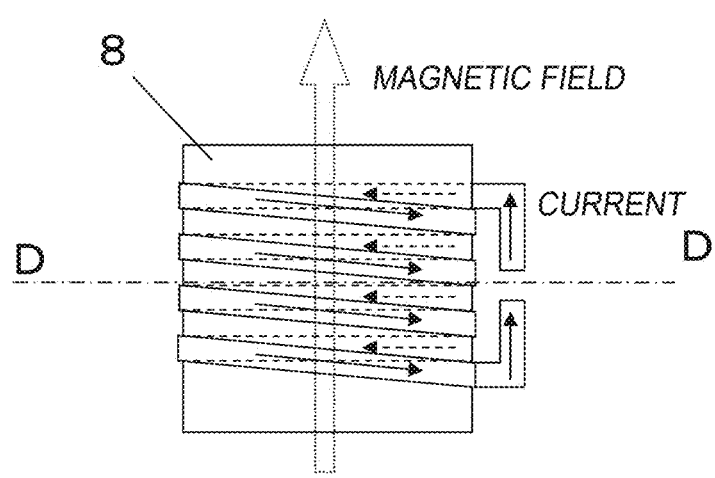
FIGS. 9A and 9B illustrate a relationship between a current and magnetic flux when the current flows through the antenna according to the embodiment of the present disclosure.
Figure 9B:
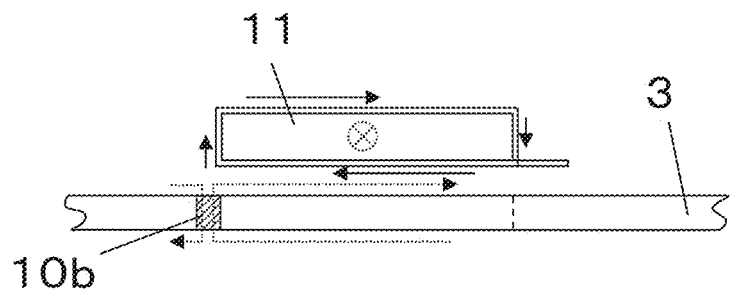
Figure 10A:
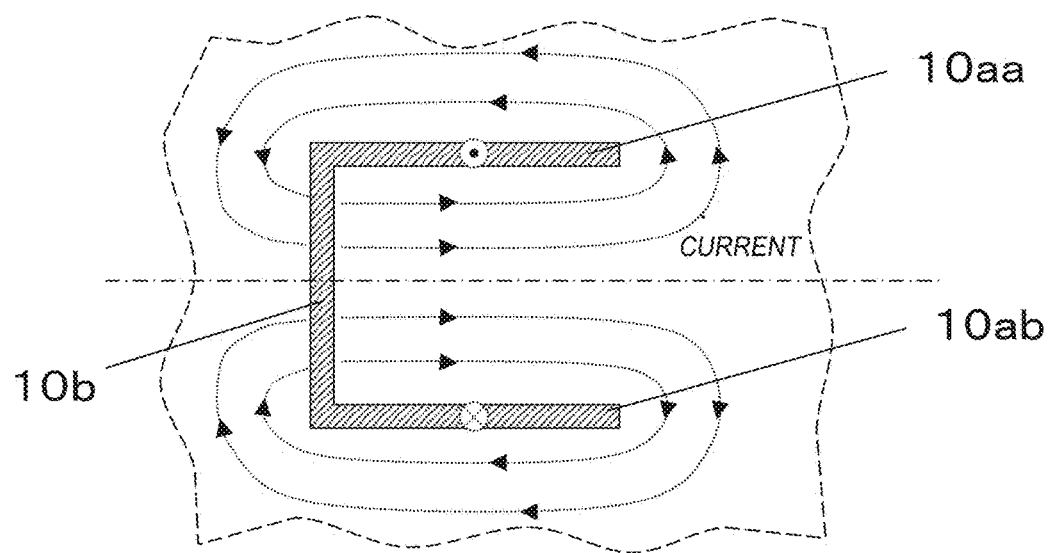
FIGS. 10A and 10B illustrate an eddy current that flows through the metal body when the current in FIG. 9 flows.
Figure 10B:
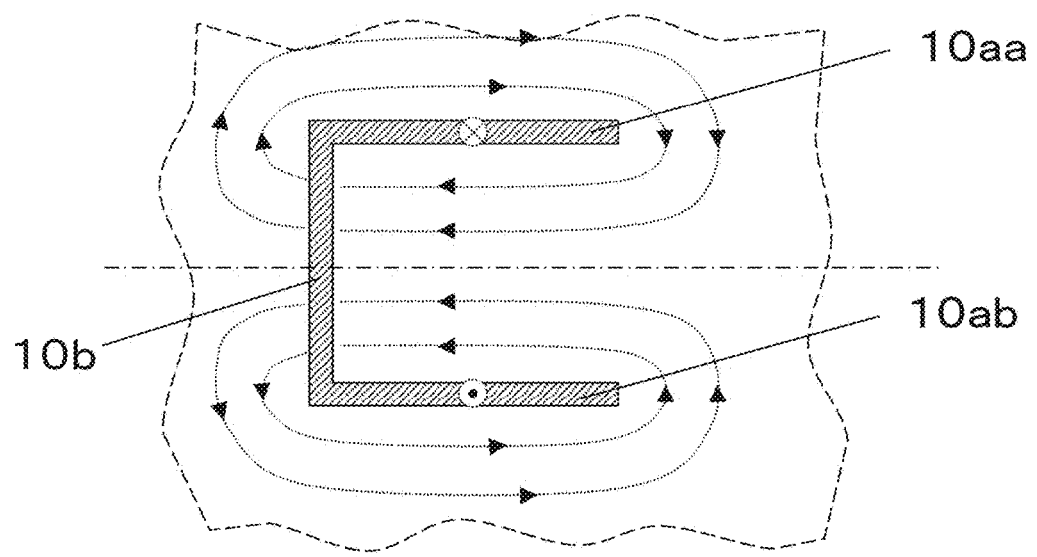
Figure 11:
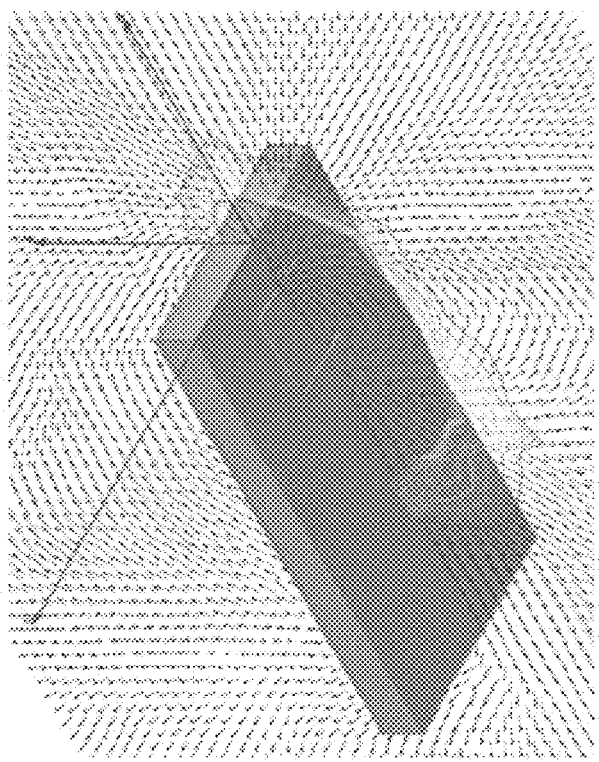
FIG. 11 illustrates a magnetic field generated by a current flowing through the metal body.

FIGS. 8A and 8B illustrate a positional relationship between the antenna and a metal body according to the embodiment of the present disclosure. FIG. 8A is a top view, and FIG. 8B is a cross-sectional view taken along line C-C of FIG. 8A. FIGS. 9A and 9B illustrate a relationship between a current and magnetic flux when the current flows through the antenna according to the embodiment of the present disclosure. FIG. 9A is a top view, and FIG. 9B is a cross-sectional view taken along line D-D of FIG. 9A. FIGS. 10A and 10B illustrate an eddy current that flows through the metal body when the current in FIG. 9 flows, FIG. 10A illustrates the surface facing the antenna seen from above and FIG. 10B is the back side shown in FIG. 10A seen from above. FIG. 11 illustrates a magnetic field generated by a current flowing through the metal body. Note that the aforementioned adjustment pattern is not shown in FIGS. 8A and 8B and FIGS. 9A and 9B to describe the features of the present embodiment in an easily understandable manner. That is, although a mechanism of adjusting inductance is not always necessary in realizing the features of the present embodiment which will be described hereinafter, provision of that mechanism will enable more accurate communication.

As shown in FIG. 8, the antenna apparatus according to the embodiment of the present disclosure is provided with antenna 8 as a coil antenna formed by winding a coil and a metal body that overlaps with antenna 8 and faces the wound coil of antenna 8. In the present embodiment, the metal body is used as rear cover 3, and rear cover 3 needs only to be a metal body and preferably has a plate shape in particular. Since an eddy current flowing through the wound coil of antenna 8 needs to flow over the surface of the metal body in one direction, the metal body is provided with a surface facing the wound coil of antenna 8, and the winding axis of antenna 8 is parallel to this surface or antenna 8 diagonally crosses this surface. Even when the surface of the metal body is perpendicular to the winding axis (coil axis) of antenna 8, the loop-shaped wound coil of antenna 8 may face the surface of the metal body, but this does not include a case where an eddy current of the wound coil of this loop-shaped coil flows over the surface of the metal body. That is, the current that flows through the wound coil facing the surface of the metal body is not loop-shaped but one-directional. The one direction is a direction that crosses second slit 10b. It is preferable that the winding axis of antenna 8 be substantially parallel to the surface of the metal body. This allows the current to efficiently flow through the metal body and allows the intensity of the magnetic field generated by the metal body to improve.

Next, the principles behind the generation of a magnetic field on the back side of rear cover 3 by antenna 8 and rear cover 3 (metal body) according to the embodiment of the present disclosure will be described. First, if no slit is provided to rear cover 3, a current that flows into or magnetic flux generated in antenna 8 provided with a metal body such as rear cover 3 around antenna 8 is canceled out by an eddy current in an opposite direction that flows into rear cover 3 or magnetic flux generated by the eddy current. The eddy current generated in rear cover 3 also weakens the magnetic field applied from outside to antenna 8, making it difficult for the magnetic field to reach antenna 8. As a result, the presence of the metal body causes the communicable region of antenna 8 to be significantly reduced and also causes the communication characteristics to deteriorate, making it extremely difficult for antenna 8 to communicate beyond the metal body.

On the other hand, the antenna apparatus according to the embodiment of the present disclosure enables communication as follows. For example, as shown in FIGS. 9A and 9B, when a current flows through the wound coil of antenna 8, a current (eddy current) in a reverse direction of the wound coil facing rear cover 3 flows through antenna 8. That is, in FIG. 9B, since the current flows through antenna 8 clockwise, a current flows through the wound coil of antenna 8 facing the rear cover from right to left. An eddy current mainly from left toward right flows through a portion of rear cover 3 facing antenna 8 (the region mainly between first slits 10a in FIG. 10A) so as to cancel out the current directed from right to left. This eddy current flowing from left to right rotates so as to form a loop around first slit 10aa and first slit 10ab respectively as shown in FIG. 10A. Note that the direction of the current flowing around upper first slit 10aa in FIG. 10A is counterclockwise and the direction of the current flowing around lower first slit 10ab is clockwise. That is, the current flows so as to form a loop in a reverse direction. When the currents that have rotated around first slits 10a respectively flow up to second slit 10b, the currents flow to the backside of rear cover 3 through second slit 10b. The current that has flown to the backside of the rear cover flows as shown in FIG. 10B. That is, the direction of the current that flows around upper first slit 10aa in FIG. 10B is clockwise, and the direction of the current that flows around lower first slit 10ab is counterclockwise. In the region sandwiched by first slits 10a, a current flows from right to left following the flow of the current loop and flows to the front side of rear cover 3 using second slit 10b.

Thus, in the same first slit 10aa, the loop of the current that flows around first slit 10aa in FIG. 10A (side which is the front side and faces the antenna) and the loop of the current that flows around first slit 10aa in FIG. 10B (backside and communication direction side) are opposite to each other. Similarly, in the same first slit 10ab, the loop of the current that flows around first slit 10ab in FIG. 10A and the loop of the current that flows around first slit 10ab in FIG. 10B are opposite to each other. On either side, the direction of the loop of the current that flows around first slit 10aa is opposite to the direction of the loop of the current that flows around first slit 10ab. It is thereby possible to generate a magnetic field directed from first slit 10aa to first slit 10ab or a magnetic field directed from first slit 10ab to first slit 10aa.

As a result, the magnetic field generated by antenna 8 in the direction toward rear cover 3 is canceled out by the current that flows through rear cover 3 on the surface on the antenna 8 side (front side). However, since the magnetic field generated by antenna 8 in the direction toward rear cover 3 and the magnetic field generated by the current that flows through rear cover 3 are in the same direction, the magnetic field generated by antenna 8 on the rear cover 3 side as shown in FIG. 11 operates as if the magnetic field penetrates rear cover 3 and performs communication.

The direction of the current flowing through the metal is not necessarily limited to the above-described direction, and the current flows along complicated paths. However, since the current in the above-described direction mainly flows as a whole, a large flow is seen in the above-described direction.

The same applies to a case where a magnetic field is received from outside. That is, when a current distribution as shown in FIG. 10B is generated on the back side of rear cover 10b by the magnetic field from outside, a current distribution as shown in FIG. 10A is generated on the front side of rear cover 3, and the relationship in current between rear cover 3 and antenna 8 is as shown in FIGS. 9A and 9B. Antenna 8 can receive the magnetic field and can be driven as if there were no rear cover 3 which is the metal body.

In order to operate in the manner described above, the following first slit and the second slit are preferable. That is, first slit 10a and second slit 10b are arranged in and around a region where antenna 8 and the metal body overlap with other. This region is, for example, a region sandwiched by two first slits 10a, a region sandwiched by each one of first slits 10a and second slit 10b and their peripheries.

Basically, two first slits 10a are formed. This is because two first slits 10a respectively become the entrance and exit of a magnetic field that spreads on the back side of rear cover 3 (communication direction side and also the outside of the communication apparatus). Therefore, it is possible to use an external end portion of rear cover 3 which is the metal body or use another through hole such as a through hole for the camera in FIG. 1. As is seen in FIG. 8A, when a vector is considered which has a direction in which a point of intersection between each one of first slits 10a and second slit 10b is assumed to be a start point and the end opposite to the start point is assumed to be an end point, the vector is provided with a component in the same direction as that of the wound coil on the metal side (X direction in FIG. 2). That is, first slit 10a need not always be substantially parallel to the wound coil of antenna 8 or substantially perpendicular to the winding direction of antenna 8, and may also be diagonal thereto, in which case, however, first slit 10a is at least not perpendicular to the winding axis of antenna 8 or parallel to the winding axis of antenna 8 (first slit 10a does not extend parallel to the Y direction in FIG. 2).

Since first slit 10a has a linear shape, a current flowing through rear cover 3 can rotate around first slit 10a efficiently. As a result, the magnetic field formed is intensified and can thereby improve its communication characteristics.

The longitudinal direction of first slit 10a is preferably parallel to the conductor facing rear cover 3, that is, perpendicular to the coil axis. In this way, the current that flows into rear cover 3 flows efficiently and rotates around each first slit 10a in a loop shape. First slit 10a is preferably outside the wound coil portion of antenna 8 when seen from above as shown in FIG. 8A. That is, first slit 10a does not face (does not overlap with) the wound coil portion of antenna 8. It is thereby possible to mostly make the directions of the currents that flow outside first slits 10a (opposite to the sides of first slits 10a facing each other) the same. Furthermore, core 11 of antenna 8 preferably overlaps with first slits 10a. In this way, the magnetic field that passes through slit 10a of rear cover 3 is intensified by core 11. When the magnetic field is intensified, the communication characteristics and communicable distance improve.

The length of first slit 10a in the longitudinal direction is preferably longer than the width of antenna 8 in the same direction. The opening area of first slit 10a directly affects the opening area of the magnetic field generated in rear cover 3, when first slit 10a is formed to be longer, the magnetic field is more intensified and the communication characteristics improve. When first slit 10a is extended to approximately twice the width of antenna 8 in the same direction, it is possible to improve both of the strength of rear cover 3 and the strength of the magnetic field, which is desirable. As a matter of course, first slit 10a may be extended even more.

The width of first slit 10a in a short direction is about 1 to 3 mm, and the greater the width, the greater the opening area can become. The width of first slit 10aa is appropriately 1 to 10 mm, for example, and first slit 10aa and first slit 10ab are preferably identical in width. When first slit 10aa and first slit 10ab are identical in width, it is possible to form a magnetic field in a well-balanced manner, but they may be different in width.

It is preferable that the distance from first slit 10aa to antenna 8 be substantially the same as the distance from first slit 10ab to antenna 8. It is preferable that first slit 10aa and first slit 10ab be substantially identical in length. As a result, the loop of the current flowing around first slit 10aa becomes similar to the loop of the current flowing around first slit 10ab, which makes it possible to form a magnetic field in a well-balanced manner.

One second slit 10b may be sufficient. A directional vector of second slit 10b whose start point and end point correspond to two points of intersection with first slit 10a has a component in the same direction as the winding axis (Y direction in FIG. 2). That is, the component is not parallel to the winding coil direction (X direction). Second slit 10b is preferably parallel to the axial direction (Y direction) of antenna 8. In this way, it is possible to connect between first slits 10a in the shortest distance and minimize the slit area. Minimizing the slit area makes it possible to maintain the strength of rear cover 3. Second slit 10b is preferably outside antenna 8 when seen from above as shown in FIG. 8A. In this way, it is possible to maximize the area where first slits 10a overlap with antenna 8 and thereby improve the characteristics of antenna 8.

The width of second slit 10b in a short direction is approximately 1 to 3 mm, and the larger the better. As shown in FIG. 9B, the currents flowing through the side walls of second slit 10b are different in direction and may possibly cancel out each other. For this reason, the width of second slit 10b in the short direction is preferably large, and setting the width of second slit 10b to approximately 1 to 10 mm make it possible to maintain both of the strength of rear cover 3 and the strength of the magnetic field.

The width of second slit 10b in the longitudinal direction is preferably longer than the width of antenna 8 in the same direction. It is thereby possible to secure space for more currents to flow between first slits 10a. As a result, the magnetic field generated by the current flowing through rear cover 3 is intensified and the communication characteristics improve. The width of second slit 10b in the longitudinal direction is appropriately about 0.5 to 2 times the width of antenna 8 in the same direction, but may be a width within other ranges.

First slit 10a and second slit 10b in the short direction need not be the same width throughout the whole longitudinal direction, and this width may vary.

When the entire or most of antenna 8 comes close to rear cover 3 (metal body), the function for an eddy current flowing through rear cover 3 to weaken the current or magnetic field of antenna 8 increases, so that the magnetic field generated by rear cover 3 and the communication characteristics can be improved. Meanwhile, when the entire or most part of antenna 8 is separated from rear cover 3 (metal body), the function for an eddy current flowing through rear cover 3 to weaken the current or magnetic field of antenna 8 decreases, so that the communication characteristics of antenna 8 itself can be improved. In the present embodiment, since antenna 8 is attached to rear cover 3, a gap (clearance) having a size of approximately several tens to several hundreds of μm is generated, the gap being equivalent to the thickness of the insulated adhesive tape.

Figure 12:
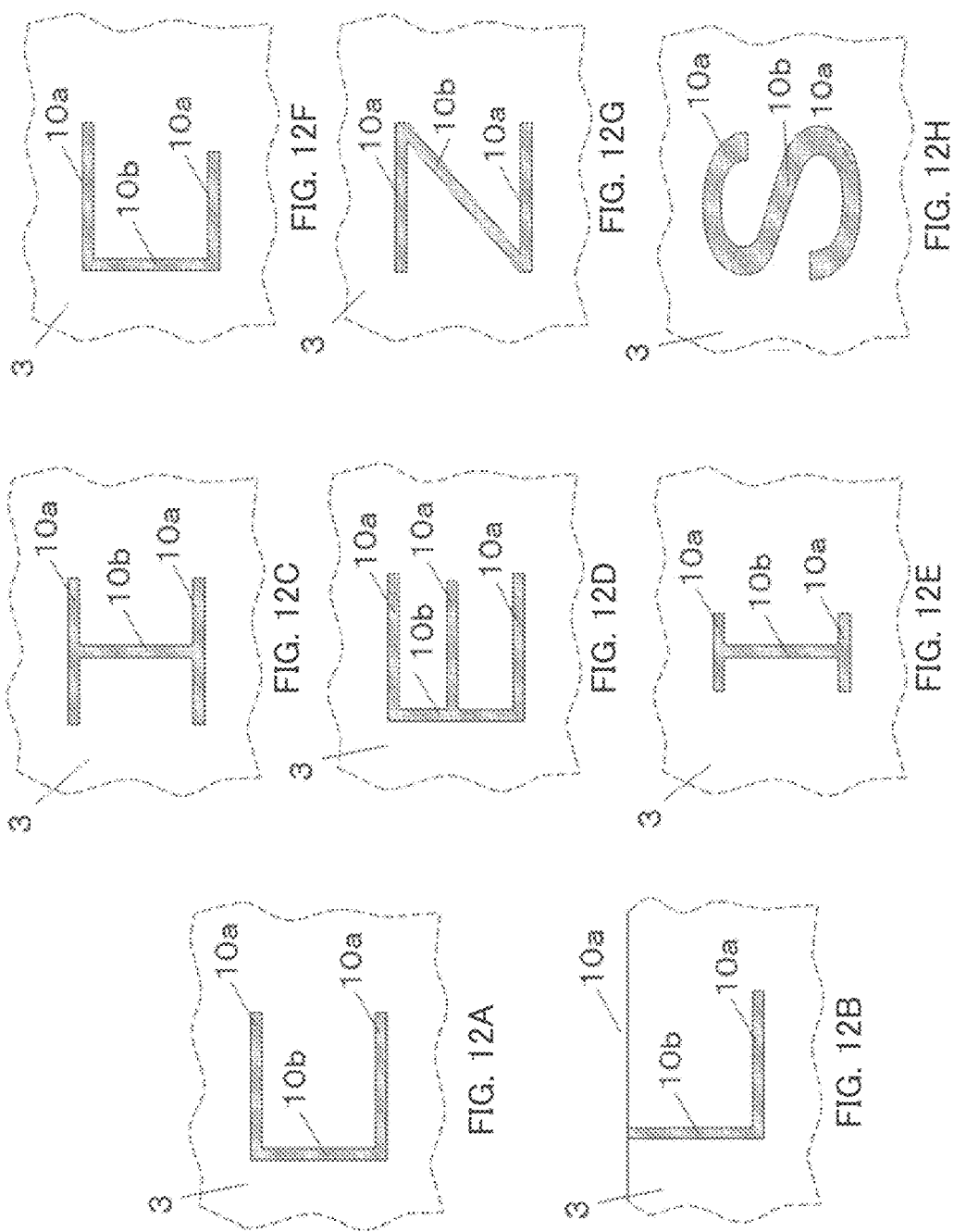
FIGS. 12A to 12H illustrate slits of the metal body according to the embodiment of the present disclosure.

Regarding the shape of first slits 10a and second slit 10b, the shape may be specifically shown in FIG. 12. As a matter of course, other shapes may also be adopted as long the above-described conditions are satisfied. FIG. 12 illustrates metal body slits according to the embodiment of the present disclosure.

FIG. 12A shows the most efficient shape provided on rear cover 3 shown in FIG. 1A, FIG. 5 or the like. That is, since two first slits 10a are substantially identical in width and length and are parallel to each other, the loops of the currents flowing around the respective slits are substantially identical in size, which generates a magnetic field efficiently. Moreover, since second slit 10b connects between end portions on the same sides of first slits 10a, since second slit does not interrupt the current flowing through the region where second slit 10b is sandwiched between first slits 10a.

In FIG. 12B, as described in FIG. 1B, the end portion of rear cover 3 is used as one first slit 10a. Therefore, only one first slit 10a is formed.

As shown in FIG. 12C, second slit 10b may connect between intermediate points (may not necessarily be centers) of first slits 10a. Thus, since second slit 10b is placed in a well-balanced manner between intermediate points of first slits 10a, it is possible to enhance the strength of the rear cover. Note that second slit 10b may be placed so as to connect the centers in the longitudinal direction of first slits 10a to secure the efficiency of the current that flows through rear cover 3, and the strength.

As shown in FIG. 12D, three or more first slits 10a may be provided. Though this is not advantageous from the standpoint of performance, such a configuration is possible from the standpoint of design.

As shown in FIG. 12E, first slits 10a may be formed to have a short length. That is, the length of the first slit in the longitudinal direction may be about 0.5 times the length of antenna 8 in the same direction. In this way, it is possible to form small slits and secure the strength of rear cover 3.

As shown in FIG. 12F, two first slits 10a need not have the same length in the longitudinal direction.

As shown in FIG. 12G, second slit 10b need not be perpendicular to first slits 10a. Compared to FIG. 12A or the like, this shape improves the strength of rear cover 3. That is, this shape reduces the maximum area of the region where the strength of the region becomes unstable when surrounded by first slits 10a and second slit 10b.

As shown in FIG. 12H, first slit 10a and second slit 10b may curve or bend. That is, the line may be C-shaped or U-shaped, arc-shape, wave-shape, serrated or the like.

In this way, first slit 10a and second slit 10b may adopt a variety of shapes but they are not aligned on a single line or connected in a loop shape.

Figure 13:
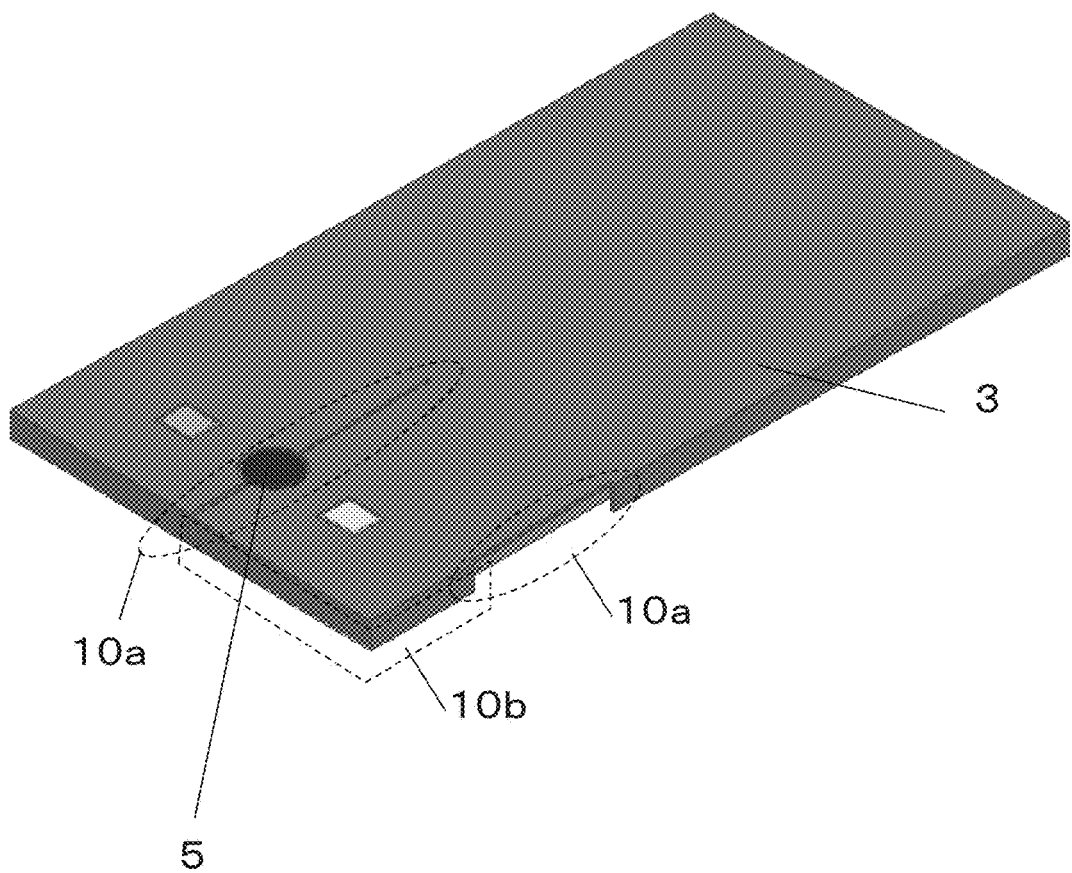
FIG. 13 is a perspective view on rear cover side of the portable terminal according to the embodiment of the present disclosure.
Figure 14:
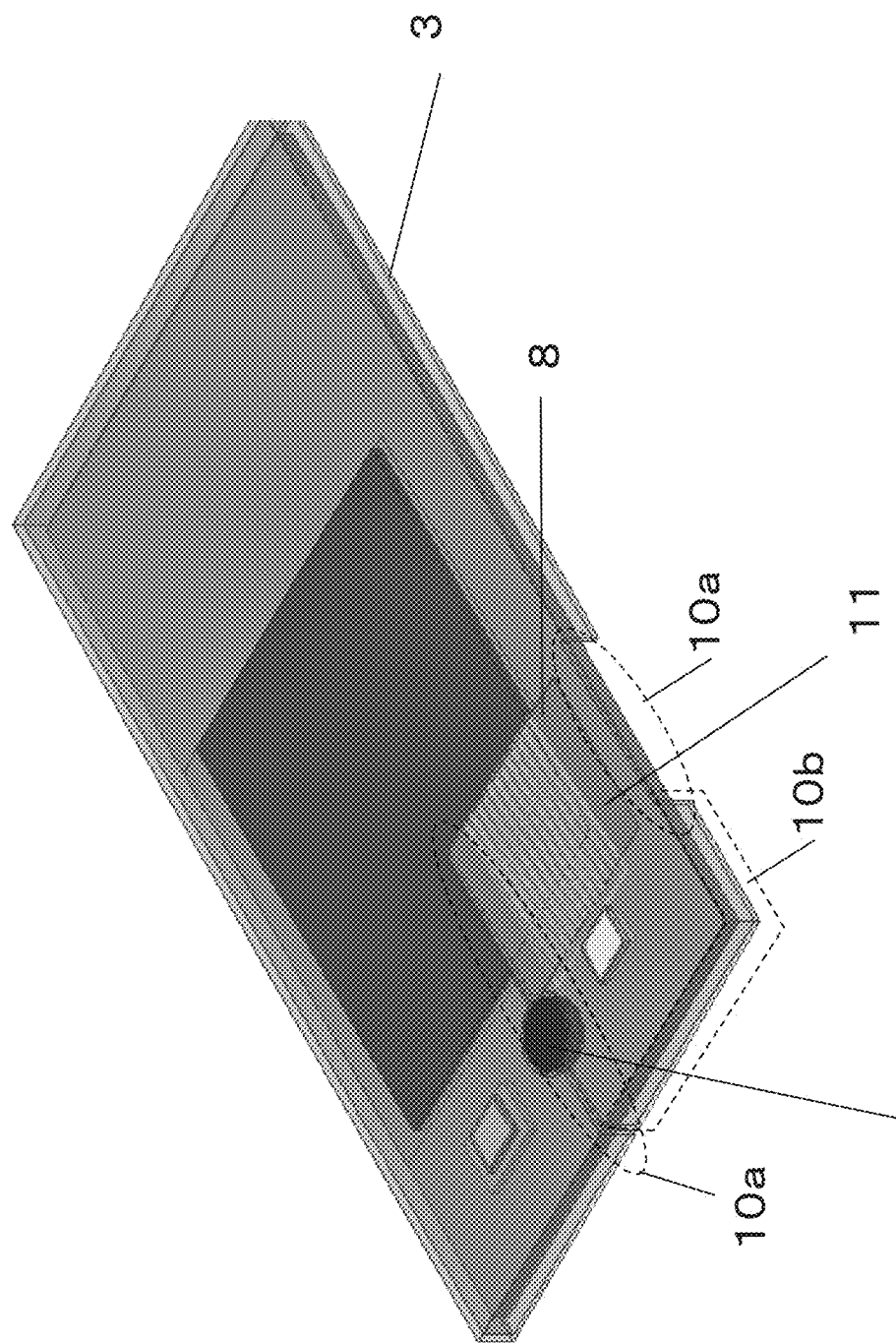
FIG. 14 is a perspective view illustrating a positional relationship between the antenna, first slits and a second slit according to the embodiment of the present disclosure.
Figure 15A:
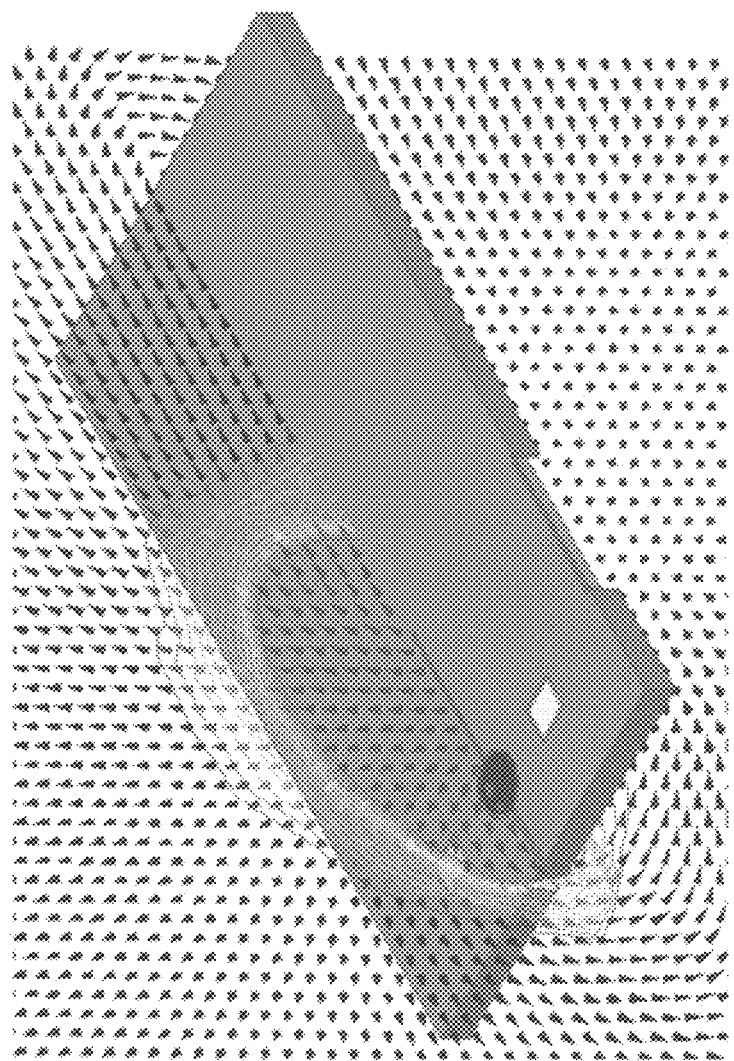
FIG. 15A illustrates magnetic flux generated by the antenna in FIG. 14.
Figure 15B:
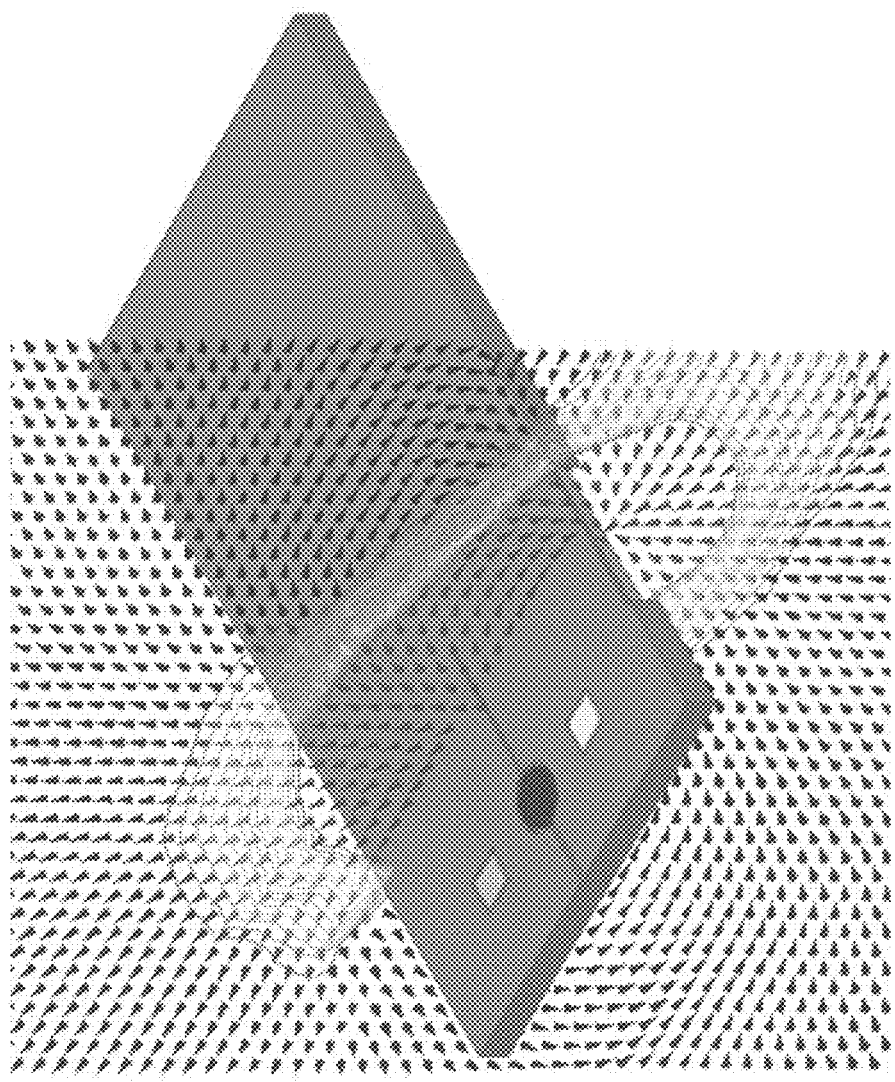
FIG. 15B illustrates magnetic flux generated by the antenna in FIG. 14.
Figure 16:
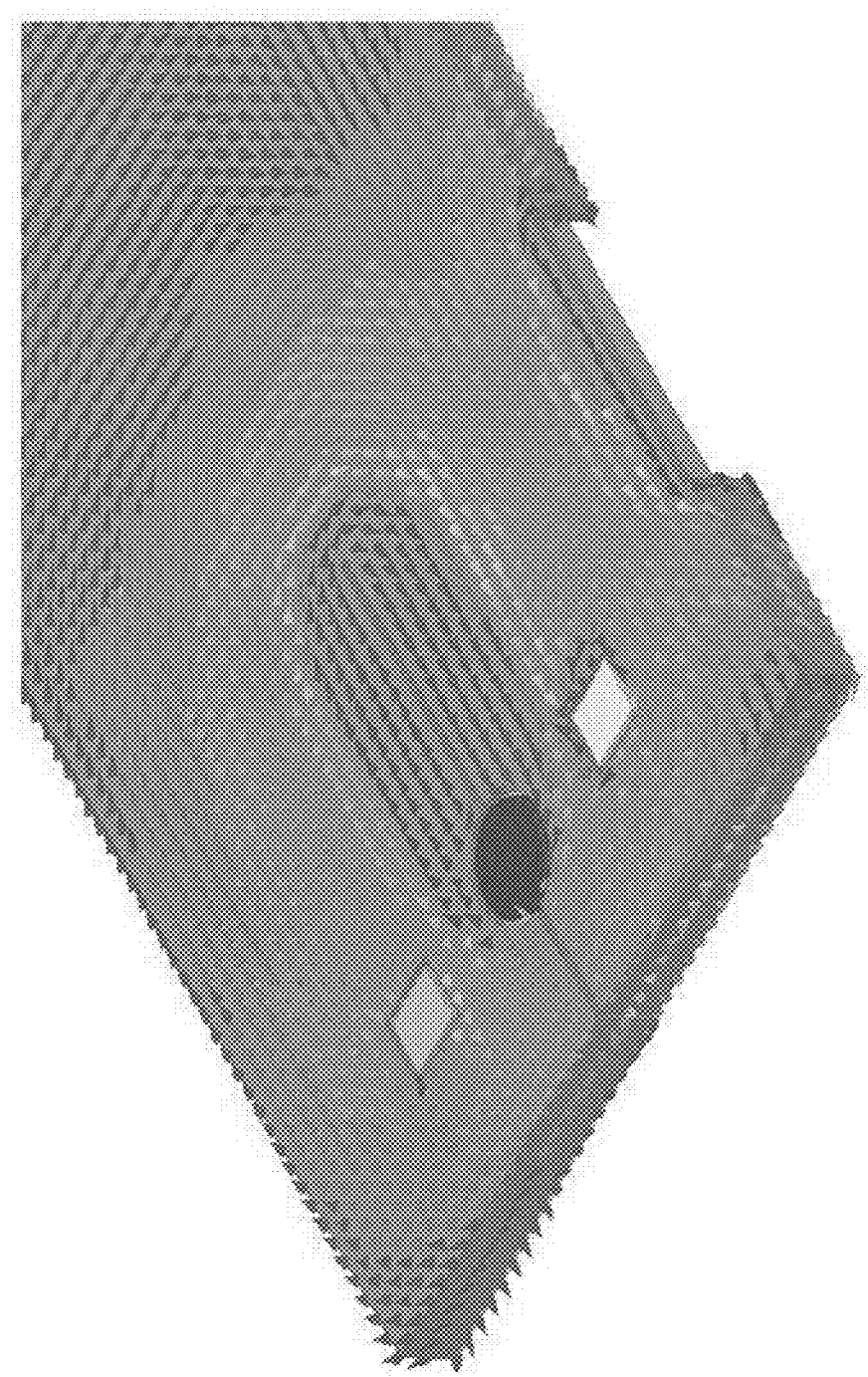
FIG. 16 illustrates an eddy current flowing through the rear cover by the magnetic flux in FIG. 15.

Next, variations of the present embodiment will be described. FIG. 13 is a perspective view of the portable terminal on the rear cover side according to the embodiment of the present disclosure. FIG. 14 is a perspective view illustrating a positional relationship between the antenna, and first slit and second slit according to the present embodiment. FIGS. 15A and 15B illustrate magnetic flux generated by the antenna in FIG. 14. FIG. 16 illustrates an eddy current that flows through the rear cover by the magnetic flux in FIG. 15.

As shown in FIG. 13, one of first slits 10a is provided while penetrating a through hole for camera 5 of rear cover 3 and an end portion of the slit extends to an end portion of rear cover 3. The other one of first slits 10a is provided such that part of its end portion of rear cover 3 is chipped inward. That is, a part of each of slits 10a corresponds to the end portion of rear cover 3. The end portion of rear cover 3 between both slits 10a serves the role of second slit 10b. Therefore, the end portion of rear cover 3 which corresponds to the portion of second slit 10b should not be covered with another conductor. At least an end portion of the surface of the case (rear side of rear cover 3 at the end of the case) is preferably made of an insulator such as resin. This can be equivalent to quite a large slit being formed from the end portion of rear cover 3. The areas of first slits 10a and second slit 10b are areas of the insulating regions which may be filled with an insulating member such as resin. In FIG. 13, the through hole for camera 5 is part of one first slit 10a, but the through hole need not always be part of one of the slits. However, such a configuration is efficient because the through hole for camera 5 can serve for two purposes. Although the other one of first slits 10a is formed on the side wall of rear cover 3, the side wall is not necessarily formed in rear cover 3. Whatever the case, a part of first slit 10a is connected to the end portion of rear cover 3 as long as the end portion of rear cover 3 is used as second slit 10b. At least two first slits 10a may be provided.

As shown in FIG. 14, the longitudinal direction of both first slits 10a is a direction that crosses the winding axis direction of antenna 8 and is not parallel. The direction is preferably substantially perpendicular, and the term "substantially perpendicular" used herein refers to a relationship of 80 degrees to 100 degrees when "perpendicular" means 90 degrees. The length of both first slits 10a in the longitudinal direction is preferably longer than the width of antenna 8 in the same direction and the communication characteristics are thereby improved. Although the shape of first slit 10a is linear, the shape is not limited to be linear and may be other shapes including a curved line. However, first slit 10a is provided with a longer slit width in the longitudinal direction than the slit width in other directions.

In FIG. 14, one first slit 10a on the camera 5 side is substantially parallel to and substantially overlaps with (the term "overlap" used herein does not always mean "contacting") the end side of core 11 of antenna 8. First slits 10a may overlap with the coil wound section of antenna 8, but preferably does not overlap because the characteristics of antenna 8 would improve in this way. Therefore, one first slit 10a may preferably overlap with the non-coil wound section of core 11 or may not overlap with antenna 8 as in the case of other first slit 10a. When one first slit 10a does not overlap with antenna 8, the distance between first slit 10a and antenna 8 is preferably 15 mm or less.

It can be seen in FIG. 15A that the magnetic flux generated by antenna 8 extends outward from one first slit 10a on the camera 5 side. It can be seen in FIG. 15B that the magnetic flux extends from one first slit 10a on the camera 5 side to other first slit 10a. Providing first slits 10a and second slit 10b in this way makes it apparent that communication of antenna 8 is enabled even when rear cover 3 is a conductor. The direction of the magnetic flux may be opposite.

It can be seen in FIG. 16 that an eddy current of rear cover 3 flows around one first slit 10a on the camera 5 side in a loop shape. It can be also seen that an eddy current flows around other first slit 10a in an approximately semicircular loop caused by the eddy current.

In FIG. 14 and FIG. 16, an eddy current flows in the same direction as that of the wound coil of antenna 8 right above antenna 8 on the surface of rear cover 3. This indicates that the same thing has occurred as the phenomenon that has occurred based on the principle described in FIG. 9 and FIG. 10.

Thus, even when an end portion of rear cover 3 is used as at least part of first slit 10a and second slit 10b and an insulating region on the outer side of rear cover 3 is used, it is possible to obtain effects similar to those obtained when first slit 10a and second slit 10b are not connected to the end portion of rear cover 3.

Thus, the regions of first slit 10a and second slit 10b may be insulated or at least part thereof may be an end portion (edge) of rear cover 3 (conductor such as metal).

As described above, the antenna apparatus of the present embodiment includes: antenna 8 of a wound coil; rear cover 3 that includes a surface facing the wound coil of antenna 8, that is placed so that a winding axis of antenna 8 and the surface are parallel to each other or to diagonally cross; at least two first insulating regions (first slits 10a) provided on rear cover 3 and arranged apart from each other in a winding axis direction of antenna 8; and a second insulating region (second slit 10b) that connects between first slits 10a. The longitudinal directions of respective first slits 10a cross the winding axis direction of antenna 8. The term "cross" used herein does not require the longitudinal directions to actually cross the winding axis direction, but means that at least the longitudinal directions of first slits 10a are not parallel to the winding axis direction of antenna 8. In addition, at least part of the region between two first slits 10a faces antenna 8 on the surface of rear cover 3.

The disclosure of Japanese Patent Application No. 2012-195870, filed on Sep. 6, 2012, including the specification, drawings and abstract is incorporated herein by reference in its entirety.

INDUSTRIAL APPLICABILITY

According to the present disclosure, even when a small-sized antenna is placed inside a box-shaped metal case, good communication performance can be obtained with a through hole having a smaller area than the antenna. Furthermore, since it is possible to provide an antenna apparatus and a communication apparatus having a wider communicable region than a loop antenna, the present disclosure is useful as a variety of communication devices such as a mobile phone. The present disclosure is also applicable to systems for drug management, dangerous goods management, valuable goods management or the like except storage rack or showcase, particularly enabling automatic merchandise management or book management.

REFERENCE SIGNS LIST

1 Portable terminal
2 Display panel
3 Rear cover
4 Battery
5 Camera
6 Electronic circuit substrate
7a, 7b Antenna input and output pin
8 Antenna
8a, 8b External connection terminal
9 Antenna control section
10a First slit
10b Second slit
11 Core
12 Flexible substrate
12a Lower flexible substrate
12b Upper flexible substrate
13 Adjustment pattern
13a Adjustment pattern end
13b, 13c, 13d Adjustment conductor
14a, 14b Winding pattern
17a, 17b, 19a, 19b Pattern exposing portion
20 Frame The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication device having a generally rectangular planar shape, the communication device comprising:
   a display panel;
   a cover including a metal surface;
   a slit arranged in a side wall of the cover;
   a wound coil arranged between the display panel and the cover;
   a camera; and
   a battery,
   wherein the slit, the wound coil, and the camera are positioned in an upper portion along a longitudinal direction of the generally rectangular planar shape of the communication device, and the battery is positioned in a lower portion along the longitudinal direction of the generally rectangular planar shape of the communication device.

2. The communication device according to claim 1, wherein the display panel is arranged in at least the lower portion.

3. The communication device according to claim 1, wherein the wound coil is a Near Field Communication (NFC) antenna.

4. The communication device according to claim 1, wherein the wound coil does not overlap with the slit in the metal surface.

5. The communication device according to claim 1, wherein the slit has a linear shape.

6. The communication device according to claim 1, wherein the slit extends to an end portion of the cover.

7. The communication device according to claim 1, wherein the slit is parallel to an edge line of the cover.

8. The communication device according to claim 1, wherein the slit includes two linear portions which are parallel to each other.

9. The communication device according to claim 1, wherein the wound coil is a coil pattern on a flexible substrate.

10. The communication device according to claim 1, wherein a length of the slit in a longitudinal direction of the slit is longer than a length of the wound coil in the longitudinal direction of the slit.

11. The communication device according to claim 1, wherein at least a portion of the wound coil overlaps with the metal surface.

12. A communication device having a generally rectangular planar shape, the communication device comprising:
   a display panel;
   a cover including a metal surface;
   a slit arranged in a side wall of the cover;

a wound coil arranged between the display panel and the cover;

a camera; and a battery, wherein the slit, the wound coil, and the camera are positioned in an upper portion along a longitudinal direction of the generally rectangular planar shape of the communication device, and the battery is positioned in a lower portion along the longitudinal direction of the generally rectangular planar shape of the communication device, and the display panel is a touch panel and is arranged in both the upper portion and the lower portion.

13. The communication device according to claim 12, wherein the wound coil is a Near Field Communication (NFC) antenna.

14. The communication device according to claim 12, wherein the wound coil does not overlap with the slit in the metal surface.

15. The communication device according to claim 12, wherein the slit has a linear shape.

16. The communication device according to claim 12, wherein the slit extends to an end portion of the cover.

17. The communication device according to claim 12, wherein the slit is parallel to an edge line of the cover.

18. The communication device according to claim 12, wherein the slit includes two linear portions which are parallel to each other.

19. The communication device according to claim 12, wherein the wound coil is a coil pattern on a flexible substrate.

20. The communication device according to claim 12, wherein a length of the slit in a longitudinal direction of the slit is longer than a length of the wound coil in the longitudinal direction of the slit.

* * * * *